United States Patent
Ebert et al.

(10) Patent No.: US 11,742,523 B2
(45) Date of Patent: Aug. 29, 2023

(54) ELECTROLYTE SOLUTIONS

(71) Applicant: Ascend Performance Materials Operations LLC, Houston, TX (US)

(72) Inventors: Jefferson Thomas Ebert, Houston, TX (US); Benjamin Haseltine, Houston, TX (US)

(73) Assignee: Ascend Performance Materials Operations LLC, Houston, TX (US)

(*) Notice: Subject to any disclaimer, the term of this patent is extended or adjusted under 35 U.S.C. 154(b) by 261 days.

(21) Appl. No.: 17/162,987

(22) Filed: Jan. 29, 2021

(65) Prior Publication Data

US 2021/0242503 A1    Aug. 5, 2021

Related U.S. Application Data

(60) Provisional application No. 62/968,684, filed on Jan. 31, 2020.

(51) Int. Cl.
| | |
|---|---|
| *H01M 10/0569* | (2010.01) |
| *H01M 10/0525* | (2010.01) |
| *H01M 10/0567* | (2010.01) |
| *H01M 10/0568* | (2010.01) |

(52) U.S. Cl.
CPC ... *H01M 10/0569* (2013.01); *H01M 10/0525* (2013.01); *H01M 10/0567* (2013.01); *H01M 10/0568* (2013.01); *H01M 2300/0034* (2013.01)

(58) Field of Classification Search
None
See application file for complete search history.

(56) References Cited

U.S. PATENT DOCUMENTS

| 9,819,057 B2 | 11/2017 | Suh et al. | |
|---|---|---|---|
| 2005/0014072 A1* | 1/2005 | Yamaguchi | ....... H01M 10/0525 |
| | | | 429/329 |
| 2013/0330628 A1 | 12/2013 | Hasegawa et al. | |
| 2017/0288268 A1 | 10/2017 | Kim et al. | |
| 2017/0346127 A1 | 11/2017 | Zhang et al. | |

FOREIGN PATENT DOCUMENTS

| CN | 109473713 A | 3/2019 |
|---|---|---|
| CN | 110649232 A | 1/2020 |
| EP | 3373380 A1 | 9/2018 |

OTHER PUBLICATIONS

Machine Translation of Chinese Patent Publication No. 109473713 (Year: 2019).*

* cited by examiner

*Primary Examiner* — Wyatt P McConnell
(74) *Attorney, Agent, or Firm* — Cozen O'Connor

(57) ABSTRACT

An electrolyte solution comprising an ionic component, a base solvent, and an additive package. The additive package comprises a trinitrile compound and a cyclic carbonate. The electrolyte solution comprises symmetric linear carbonate in an amount greater than 19 wt %, based on the total weight of the electrolyte solution.

20 Claims, 17 Drawing Sheets

ELECTROLYTE SOLUTIONS

CROSS-REFERENCE TO RELATED APPLICATION

This application claims priority to U.S. Provisional Application No. 62/968,684, filed on Jan. 31, 2020, which is incorporated herein by reference.

FIELD

The present disclosure relates generally to electrolyte solutions, e.g., for use in secondary cells, such as rechargeable batteries, or other electrical devices. More specifically, the present disclosure provides electrolyte solutions comprising trinitrile compounds and exhibiting improved performance characteristics.

BACKGROUND

Secondary cells, also known as rechargeable batteries or storage batteries, are a type of electrical batter that can be charged, discharged, and recharged many times. The term "secondary" cell distinguished these batteries from primary cells, which cannot be recharged. A secondary cell includes a cathode, an anode and an electrolyte solution that acts as a catalyst. When charging, a buildup of positive ions forms at the cathode. As a result, electrons migrate away from the anode and toward the cathode, creating a voltage potential between the cathode and the anode. The voltage that accumulates is released by a passing current from the positive cathode through an external load and back to the negative anode.

The electrolyte solution is an important component of any secondary cell, because it supports the ion flow that creates the voltage potential. The electrolyte solution serves as a catalyst to make the secondary cell conductive by promoting the movement of ions from the cathode to the anode on charge and in reverse on discharge. The performance of the secondary cell is highly dependent on the electrolyte solution, as the electrolyte solution may affect the power capability of the battery, battery performance at high and/or low temperatures, and safety of use. To improve functioning of the secondary cell, the electrolyte solution preferably exhibits low resistance to electron flow, e.g., impedance, and operates consistently and safely over a broad range of temperatures. Lithium ion batteries are a type of secondary cell that have been extensively developed and used in recent years. For example, lithium ion batteries are used to power portable electronic devices. Typical lithium ion batteries comprise a graphite-based anode, a lithium containing transition metal composite oxide, and a non-aqueous organic electrolyte solution.

The selection of electrolyte solutions can be especially important in lithium ion batteries. In lithium ion batteries, a passivation film, known as the solid electrolyte interface, forms on the surface of the anode. The solid electrolyte interface provide electrical insulation but also has sufficient ionic conductivity to support normal battery function. Furthermore, the solid electrolyte interface protects the anode from degradation, contributing to the prolonged life of the lithium ion battery. During formation of the solid electrolyte interface, a portion of the electrolyte solution is consumed. As such, the selection of electrolyte solution, e.g., the inclusion of certain components or additives in the electrolyte solution, can improve the functionality of the lithium ion battery by facilitating formation of the solid electrolyte interface or preventing degradation of the solid electrolyte interface.

U.S. Pat. No. 9,819,057 discloses a rechargeable lithium battery includes a compound represented by a Chemical Formula 1. In Chemical Formula 1, each of k, l, and m is independently an integer of 0 to 20, n is an integer of 1 to 7, and k, l and m are selected such that the compound of Chemical Formula 1 has an asymmetrical structure. The compound of Chemical Formula 1 may be included in the positive electrode, the negative electrode, or the electrolyte of the rechargeable lithium battery.

The electrolyte solution is integral to the development of improved secondary cells, such as lithium ion batteries. As portable electronics continue to develop, manufacturers and consumers demand high-performing secondary cells. In light of this, there is a need for novel electrolyte solutions that have surprising chemical characteristics, e.g., polarizability, flash point, and/or viscosity, for use in secondary cells, e.g., lithium ion batteries, that demonstrate unexpected improvements performance characteristics, e.g., impedance growth.

SUMMARY

The present disclosure provides electrolyte solutions, such as those for use in secondary cells. In some cases, the disclosure describes an electrolyte solution comprising an ionic component, a base solvent, optionally comprising symmetric linear carbonate (diethyl carbonate, or dimethyl carbonate, or combinations thereof) in an amount greater than 19 wt %, based on the total weight of the electrolyte solution, and an additive package. The additive package comprises a trinitrile compound having a chemical structure described herein (tricyanohexane) and (less than 30 wt % of) a cyclic carbonate compound having a chemical structure described herein (vinylene carbonate or ethylene carbonate or combinations thereof, or fluoroethylene carbonate (less than 6 wt %). The electrolyte solution may further comprise asymmetric linear carbonates, e.g., ethylmethyl carbonate, in an amount less than 50 wt % and optionally a sulfonate, e.g., methylene methane disulfonate. The weight ratio of the cyclic carbonate compound to the trinitrile compound may be from 0.5:1 to 5:1. In some cases, the trinitrile compound comprises tricyanohexane, the carbonate compound comprises vinylidene carbonate, and the solution demonstrates a voltage drop of less than 0.25 V. The electrolyte solution may exhibit a first cycle coulombic efficiency greater than 0.85 over 20 cycles and/or an impedance growth of less than 20% over 25 cycles. In some cases, the present disclosure relates to an electrolyte solution comprising the ionic component, the base solvent, and an additive package comprising the trinitrile compound and a sulfonate compound having a chemical structure described herein. In some embodiments, the disclosure relates to a secondary cell comprising a cathode, optionally having a cathode active material comprising a lithium-containing transition metal composite oxide, an anode optionally comprising graphite; and the electrolyte solution. The cell may demonstrate a 5 day gas generation value of less than 4.9 mL when operated at 4.48 volts.

BRIEF DESCRIPTION OF THE DRAWINGS

A further understanding of the nature and advantages of the disclosed technology may be realized by reference to the remaining portions of the specification and the drawings.

DETAILED DESCRIPTION

Introduction

Figure 1:
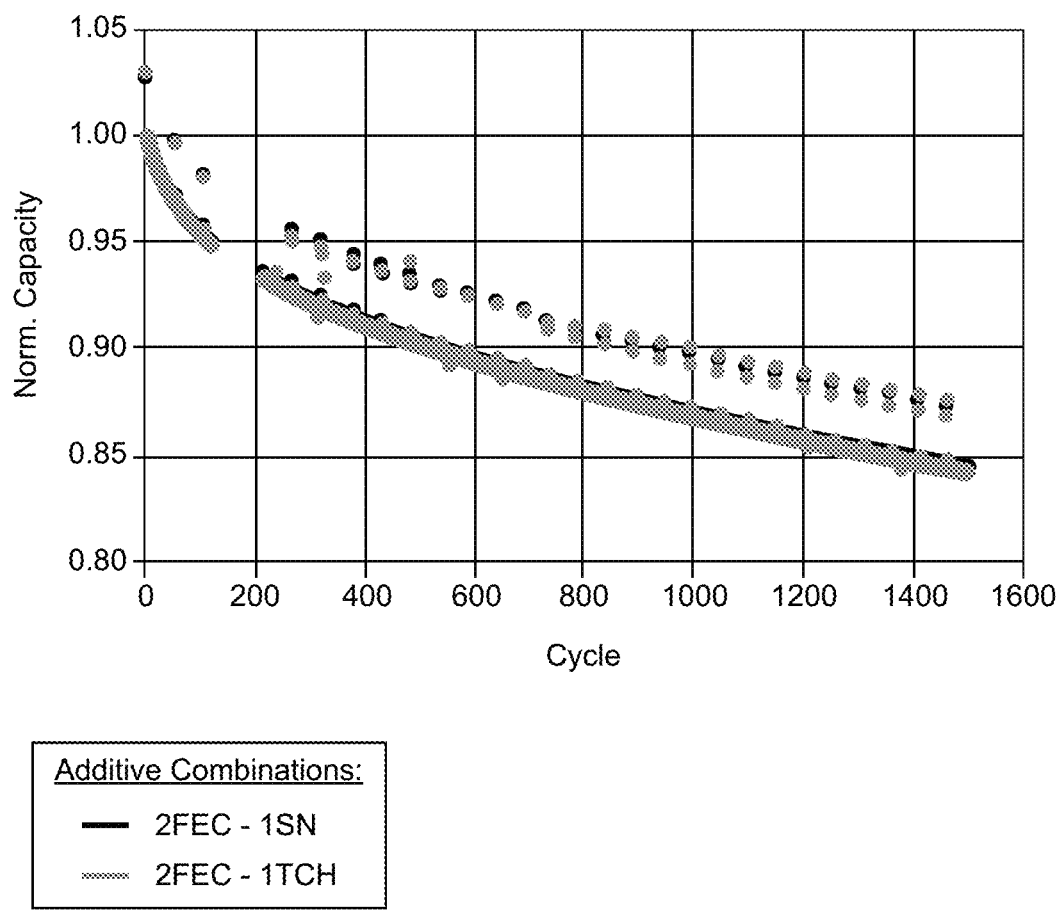
FIG. 1 is a plot of norm. capacity vs. cycles for examples of embodiments of the disclosure and comparative examples.
Figure 2:
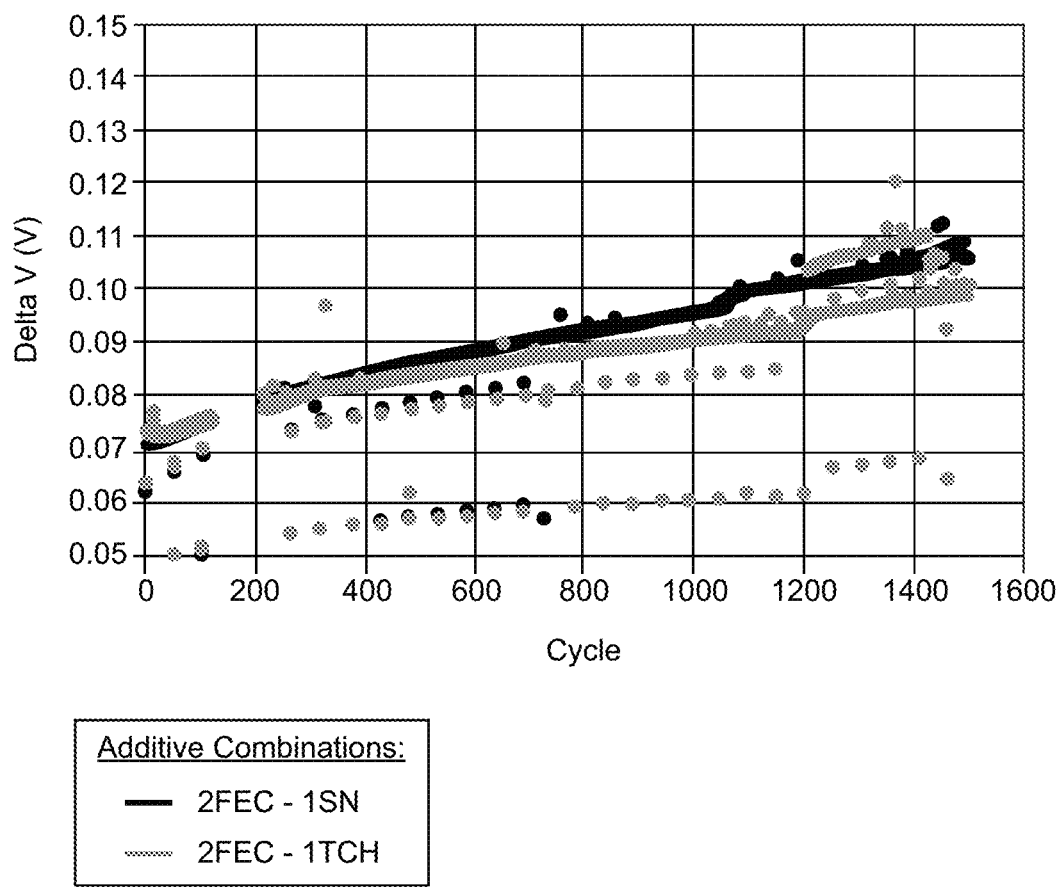
FIG. 2 is a plot of delta V vs. cycles for examples of embodiments of the disclosure and comparative examples.
Figure 3:
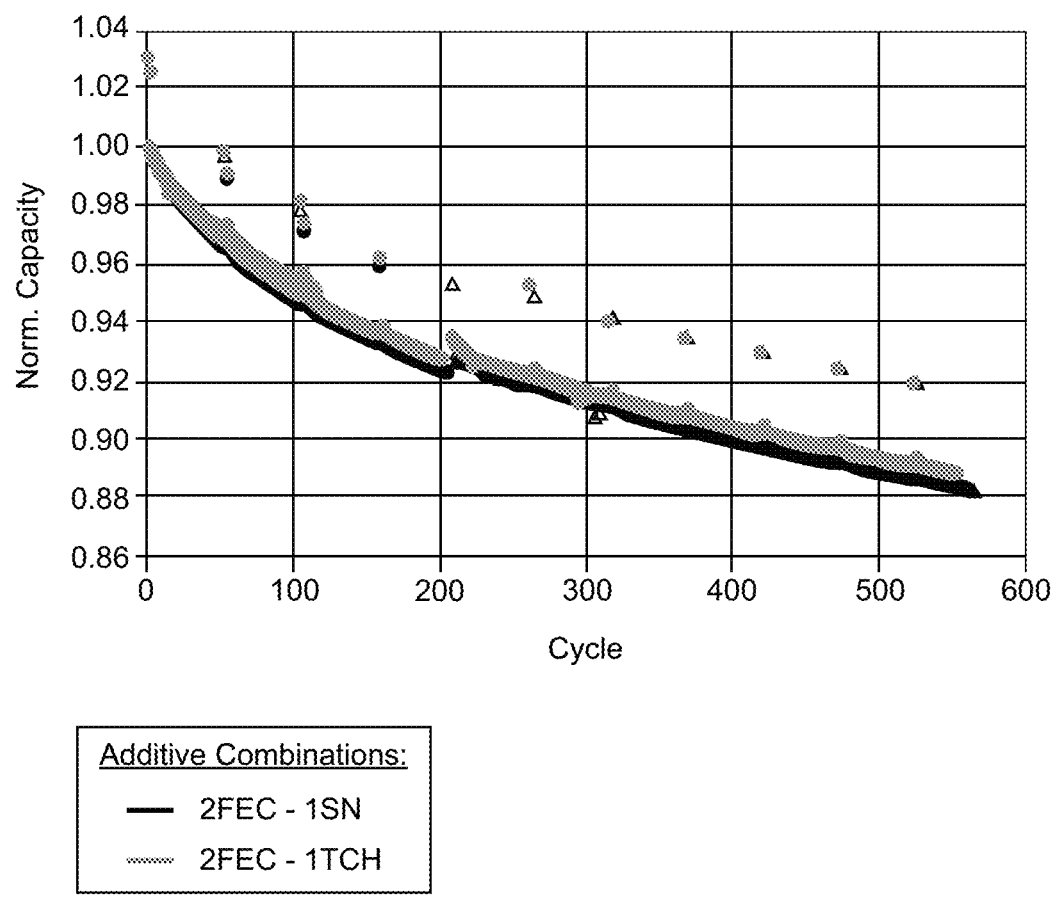
FIG. 3 is a plot of norm. capacity vs. cycles for examples of embodiments of the disclosure and comparative examples.
Figure 4:
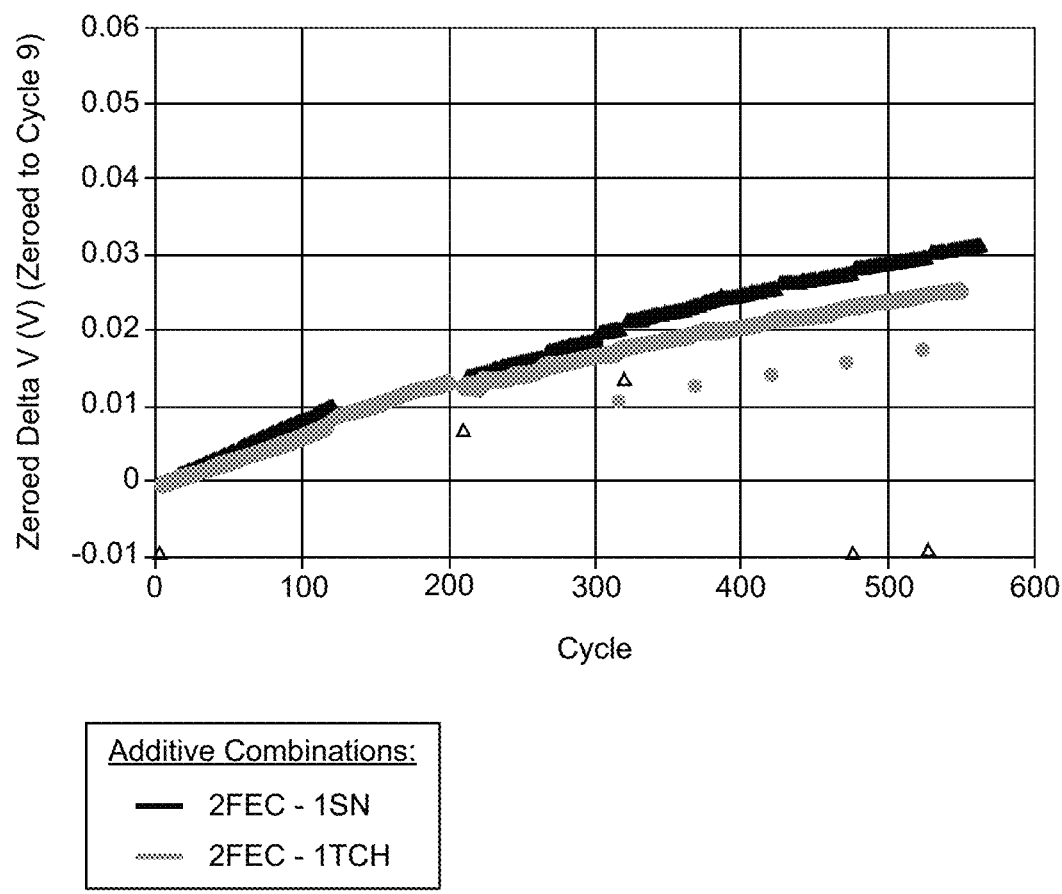
FIG. 4 is a plot of (zeroed) delta V vs. cycles for examples of embodiments of the disclosure and comparative examples.
Figure 5:
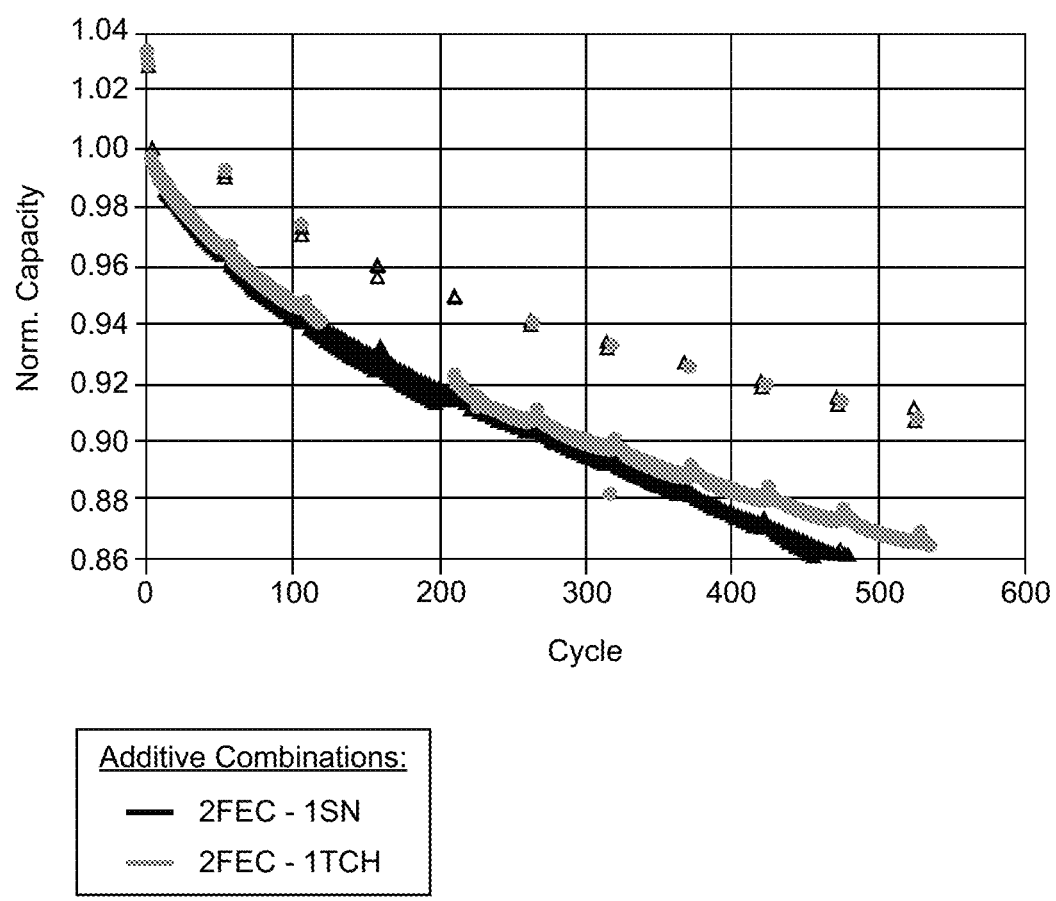
FIG. 5 is a plot of norm. capacity vs. cycles for examples of embodiments of the disclosure and comparative examples.

Conventional electrolyte solutions comprise an ionic component and a base solvent. In addition, an additive package is often included to provide features that improve the performance of the cell in which the electrolyte composition is utilized. Conventional base solvents may comprise carbonates, e.g., ethylene carbonate (EC), ethylmethyl carbonate (EMC), and diethyl carbonate (DEC). These base solvents, however, when employed with conventional additive packages, suffer from problems with viscosity and polarizability, as well as low flash points. As a result, the battery cells that employ the conventional electrolyte compositions demonstrate poor performance in terms of impedance growth, coulombic efficiency (CE), capacity retention, and gas generation values, among other drawbacks.

It has now been discovered that specific combination of additive package and base solvent provides for electrolyte compositions that demonstrate synergistic chemical characteristics, e.g., polarizability, flash point, and/or viscosity. And, when employed in various battery cells, these electrolyte compositions, have been found to provide for unexpected, synergistic improvements in battery performance features, e.g., low impedance growth, excellent CE, and capacity retention, as well as low levels of gas generation and dielectric constant. The combinations of trinitriles and cyclic carbonates, when employed with particular base solvents, as disclosed herein, contribute to these features. The use of trinitrile additives, has been found to advantageously improve the polarizability and flash point performance without negatively affecting other characteristics, e.g., viscosity. Stated another way, the aforementioned components, optionally employed in the disclosed concentrations, have been found to maintain lower viscosity, which leads to unexpected impedance growth performance, while still maintaining polarizability and flash point characteristics.

It has been found that, in addition to the additives in the additive package, the combination of various carbonates in the base solvent and/or in the additive package is important in the overall performance of the electrolyte solution. Without being bound by theory, it is believed that the content and chemical structure of the compounds in the electrolyte solution has a significant effect on performance. And, in particular, the synergistic combinations of cyclic and symmetric, linear carbonates have unexpectedly been found to contribute to advantageous electrolyte composition characteristics, which in turn result in significant differences in electrolytic performance. As an example, maintaining the concentration of symmetric, linear carbonates, e.g., dimethyl carbonate (DMC) and/or DEC, at the disclosed levels, provides for the synergistic balance of polarizability, flash point, and/or viscosity. Conventional electrolyte solutions employ significantly higher amounts of cyclic carbonates, e.g., EC and VC, along with lower amounts of symmetric, linear carbonates, and, as shown in the Examples herein, demonstrate significantly poorer performance.

As noted above, it has been found that the content and structure (linear vs. cyclic, symmetric vs. asymmetric) of the carbonate compound in the electrolyte solution, along with the presence of the nitrile compound, provides for the surprising chemical characteristics and performance features disclosed above.

The present disclosure provides electrolyte solutions for use in secondary cells, such as lithium ion batteries. The electrolyte solutions comprise an ionic component, a base solvent, and an additive package. In some cases, in practice, the ionic component is dissolved into the base solvent, and the additive package is optionally added to the formed solution. The present disclosure also describes secondary cells, e.g., lithium ion batteries, that utilize the electrolyte solutions described herein. In some embodiments, the electrolyte solutions comprise an ionic component, a symmetric linear carbonate, a trinitrile compound, and a cyclic carbonate.

In some embodiments, the electrolyte solutions comprise a trinitrile compound and a carbonate compound, e.g., as components of the additive package. In some cases, the electrolyte solutions further comprise a sulfonate compound. As discussed below, the trinitrile compound, the carbonate compound, the sulfonate compound of the electrolyte solutions may take various forms.

In some embodiments, for example, the electrolyte solution may comprise a mixture of the trinitrile compound, e.g., tricyanohexane (TCH), and the carbonate compound, e.g., vinylene carbonate (VC). In other embodiments, the electrolyte solution may comprise a mixture of the trinitrile compound, e.g., TCH, and the carbonate compound, e.g., fluoroethylene carbonate (FEC). In other embodiments, the electrolyte solution may comprise a mixture of the trinitrile compound, e.g., TCH, the carbonate compound, e.g., VC, and the sulfonate compound methylene methyl disulfonate (MMDS).

In some cases, the electrolyte composition comprises a nitrile compound and a sulfonate, e.g., propane sultone (PS).

Additive Package

The additive package comprises the trinitrile compound and optionally another component, e.g., a carbonate compound (as an additive). In some cases, it is contemplated that the additive package and the base solvent may each comprise a carbonate compound, and, in particular examples the same carbonate compound is present in both the base solvent and the additive package. In some embodiments, the base solvent is the solvent into which the ionic compound is initially dissolved. In this case, if the base solvent is a carbonate into which the ionic compound is initially dissolved, then that carbonate is considered to be a component of the base solvent. In some embodiments, if the additive package comprises a carbonate that is combined with the base solvent, then that carbonate is considered to be a component of the additive package. In some cases, carbonate compounds may serve as both base solvents and as components of the additive package.

Trinitrile Compound

The electrolyte solutions described herein comprise a trinitrile compound, as an additive component in the additive package. The trinitrile compound may be any organic compound comprising three cyano, or nitrile, functional groups. The inventors have found that the presence of these trinitrile compounds may advantageously provide for, inter alia, increased stabilization effect, e.g., increased or improved hygroscopic activity, by the electrolyte solution. For example, the nitrile functional groups of the trinitrile compound may scavenge water present in the electrolyte solution. The presence of water in electrolyte solutions may contribute to degradation of the secondary cell, resulting in diminished function and/or safety of use. The trinitrile compounds, perhaps due to the chemical structure including the positioning of the three nitrile groups, also contribute to many of the aforementioned performance features in addition to the stabilization benefits, when combined with the other components of the electrolyte solutions.

In some embodiments, the trinitrile compound is an organic compound having three cyano, or nitrile, functional groups on a saturated chain of carbon atoms. For example, in some embodiments, the trinitrile compound is a trinitrile alkane, e.g., an organic compound having the chemical formula $C_xH_{2x-1}(CN)_3$, wherein x is from 4 to 10. Exemplary trinitrile compounds include butane trinitrile (e.g., tricyanobutane), pentane trinitrile (e.g., tricyanopentane), hexane trintrile (e.g., TCH), heptane trinitrile (e.g., tricyanoheptane), octane trintrile (e.g., tricyanooctane), nonane trintrile (e.g., tricyanononane), and decane trintrile (e.g., tricyanodecane), and combinations thereof. In some cases, the trinitrile compound comprises TCH, butane trinitrile, or pentane trinitrile or combinations thereof.

In terms of chemical structures, the trinitrile compound may have the structure

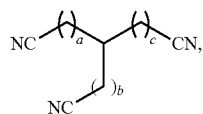

wherein a, b, and c are independently from 0 to 4, and wherein the sum of a, b, and c, is from 4 to 10.

The content of the trinitrile compound present in the additive package of the electrolyte solution is not particularly limited and may vary widely. In one embodiment, the additive package of the electrolyte solution comprises from 15 wt. % to 45 wt. % trinitrile compound, e.g., from 15 wt. % to 42 wt. %, from 15 wt. % to 40 wt. %, from 15 wt. % to 38 wt. %, from 15 wt. % to 35 wt. %, from 18 wt. % to 45 wt. %, from 18 wt. % to 42 wt. %, from 18 wt. % to 40 wt. %, from 18 wt. % to 38 wt. %, from 18 wt. % to 35 wt. %, from 20 wt. % to 45 wt. %, from 20 wt. % to 42 wt. %, from 20 wt. % to 40 wt. %, from 20 wt. % to 38 wt. %, from 20 wt. % to 35 wt. %, from 22 wt. % to 45 wt. %, from 22 wt. % to 42 wt. %, from 22 wt. % to 40 wt. %, from 22 wt. % to 38 wt. %, from 22 wt. % to 35 wt. %, from 24 wt. %, from 24 wt. % to 42 wt. %, from 24 wt. % to 40 wt. %, from 24 wt. % to 38 wt. %, or from 24 wt. % to 35 wt. %. In terms of lower limits the additive package of the electrolyte solution may comprise greater than 15 wt. % trinitrile compound, e.g., greater than 18 wt. %, greater than 20 wt. %, greater than 22 wt. %, or greater than 24 wt. %. In terms of upper limits, the additive package of the electrolyte solution may comprise less than 45 wt. % trinitrile compound, e.g., less than 42 wt. %, less than 40 wt. %, less than 38 wt. %, or less than 35 wt. %.

In some cases, the trinitrile compound may be characterized in terms of weight percentage of the total electrolyte solution. For example, the electrolyte solution may comprise from 0.01 wt % to 10 wt % trinitrile compound, e.g., from 0.05 wt % to 7 wt %, from 0.1 wt % to 5 wt %, from 0.1 wt % to 3 wt %, from 0.5 wt % to 5 wt %, from 0.5 wt % to 3 wt %, or from 0.5 wt % to 2 wt %. In terms of upper limits, the electrolyte solution may comprise less than 10 wt % trinitrile compound, e.g., less than 7 wt %, less than 5 wt %, less than 3 wt %, less than 2 wt %, less than 1.5 wt %, or less than 1 wt %. In terms of lower limits, the electrolyte solution may comprise greater than 0.01 wt % trinitrile compound, e.g., greater than 0.05 wt %, greater than 0.08 wt %, greater than 0.1 wt %, greater than 0.3 wt %, greater than 0.5 wt %, or greater than 1 wt %.

Carbonate Compound

The additive packages of the electrolyte solutions described herein comprise a carbonate compound, e.g., a cyclic carbonate compound, in addition to the trinitrile compound. In some cases, the additive packages comprise more cyclic carbonate compound than trinitrile compound (by weight), e.g., at least 10% more, at least 20% more, at least 50% more, at least 75% more, at least 100% more, or at least 125% more.

The carbonate compound may be any ester of carbonic acid, e.g., an organic compound comprising a carbonyl functional group flanked by two alkoxy functional groups. The inventors have found that the presence of these carbonate compounds may advantageously provide for improved function of the electrolyte solution, especially when balanced with the nitrile functionality of the nitrile compound. For example, the inclusion of the carbonate compounds may improve performance of the electrolyte solution across broader temperature ranges.

In some cases, the base solvent and the additive package comprise a carbonate compound. In some embodiments, the (carbonate compound in the) base solvent is the solvent into which the ionic compound is initially dissolved and/or the (carbonate compound in the) additive package is the component that is subsequently combined with the base solvent/ionic compound. In some cases, carbonate compounds may serve as both components of the base solvent and as components of the additive package.

The structure of the alkoxy functional groups of the carbonate compound is not particularly limited and may vary widely. In some embodiments, the two alkoxy functional groups of the carbonate compound are identical; in other embodiments, the two alkoxy functional groups differ from each other. Each alkoxy functional groups may be selected from aliphatic or aromatic constituents. Examples of suitable aliphatic alkoxy functional groups include a methoxy group, an ethoxy group, a propoxy group (e.g., n-propoxy or isopropoxy), and butaoxy (e.g., n-butoxy, sec-butoxy, or tert-butoxy). Examples of suitable aromatic functional groups include a phenoxy group and a benzyloxy group. Exemplary carbonate compounds include dimethyl carbonate (DMC), diethyl carbonate (DEC), dipropyl carbonate, dibutyl carbonate, dimethyl carbonate, dibenzyl carbonate, methyl ethyl carbonate, methyl propyl carbonate, methyl butyl carbonate, methyl phenyl carbonate, methyl benzyl carbonate, ethyl propyl carbonate, ethyl butyl carbonate, ethyl phenyl carbonate, ethyl benzyl carbonate, propyl butyl carbonate, propyl phenyl carbonate, propyl benzyl carbonate, butyl phenyl carbonate, butyl benzyl carbonate, and phenyl benzyl carbonate.

The carbonate compound may be a cyclic ester of carbonic acid, whereby the two alkoxy functional groups are linked by a carbon bridge. In some embodiments, the carbonate compound is cyclic ester of carbonic acid joined by an unsaturated carbon chain. In terms of chemical structures, the carbonate compound of these embodiments may have the structure:

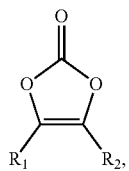

wherein $R_1$ and $R_2$ are independently selected from hydrogen, halogen, $(C_1-C_{10})$alkyl, or $(C_1-C_{10})$haloalkyl. For example, in some embodiments, each of $R_1$ and $R_2$ is hydrogen, and the carbonate compound is vinylene carbonate.

In some embodiments, the carbonate compound is cyclic ester of carbonic acid joined by a saturated carbon chain. In terms of chemical structures, the carbonate compound of these embodiments may have the structure:

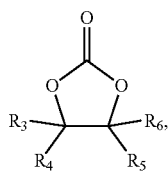

wherein $R_3$, $R_4$, $R_5$, and $R_6$ are independently selected from hydrogen, halogen, $(C_1-C_{10})$alkyl, or $(C_1-C_{10})$haloalkyl. For example, in some embodiments, each of $R_3$, $R_4$, $R_5$, and $R_6$ is hydrogen, and the carbonate compound is ethylene carbonate.

In some embodiments, one or more of $R_1$, $R_2$, $R_3$, $R_4$, $R_5$, and $R_6$ is a halogen. Examples of suitable halogens include fluorine, chlorine, bromine, and iodine. In some embodiments, for example, the carbonate compound may be flurovinylene carbonate, chlorovinylene carbonate, bromovinylene carbonate, iodovinylene carbonate, difluorovinylene carbonate, dichlorovinylene carbonate, dibromovinylene carbonate, diiodovinylene carbonate, fluoroethylene carbonate, chloroethylene carbonate, bromoethylene carbonate, iodoethylene carbonate, difluoroethylene carbonate, dichloroethylene carbonate, dibromoethylene carbonate, diiodoethylene carbonate, trifluoroethylene carbonate, trichloroethylene carbonate, tribromoethylene carbonate, triiodoethylene carbonate, tetrafluoroethylene carbonate, tetrachloroethylene carbonate, tetrabromoethylene carbonate, tetraiodoethylene carbonate. In some embodiments, the carbonate compound is fluorethylene carbonate.

In some embodiments, one or more of $R_1$, $R_2$, $R_3$, $R_4$, $R_5$, and $R_6$ is an alkyl group. Examples of suitable alkyl groups include methyl, ethyl, propyl, butyl, pentyl, hexyl, heptyl, octyl, nonyl, and decyl groups. In some embodiments, for example, the carbonate compound is substituted or unsubstituted 4-methyl-1,3,-dioxol-2-one, 4-ethyl-1,3,-dioxol-2-one, 4-propyl-1,3,-dioxol-2-one, 4-methyl-5-methyl-1,3,-dioxol-2-one, 4-ethyl-5-methyl-1,3,-dioxol-2-one, 4-propyl-5-methyl-1,3,-dioxol-2-one, ethylene carbonate, propylene carbonate, or butylene carbonate (e.g., 1,2-butylene carbonate, cis-2,3-butylene carbonate, or trans-2,3-butylene carbonate).

In some embodiments, one or more $R_1$, $R_2$, $R_3$, $R_4$, $R_5$, and $R_6$ is an haloalkyl group. Examples of suitable haloalkyl groups include —$CH_2X$, —$CHX_2$, —$CX_3$, —$CH_2CH_2X$, —$CH_2CHX_2$, —$CH_2CX_3$, —$CHXCH_3$, —$CHXCH_2X$, —$CHXCHX_2$, —$CHXCX_3$, —$CX_2CH_3$, —$CX_2CH_2X$, —$CX_2CHX_2$, —$CX_2CX_3$, —$CH_2CH_2CH_2X$, —$CH_2CH_2CHX_2$, —$CH_2CH_2CX_3$, —$CH_2CHXCH_3$, —$CH_2CHXCH_2X$, —$CH_2CHXCHX_2$, —$CH_2CHXCX_3$, —$CH_2CX_2CH_3$, —$CH_2CX_2CH_2X$, —$CH_2CX_2CHX_2$, —$CH_2CX_2CX_3$, —$CHXCX_2CH_2X$, —$CHXCX_2CHX_2$, —$CHXCX_2CX_3$, —$CX_2CX_2CX_3$, —$CH_2CH_2CH_2CX_3$, —$CH_2CH_2CHXCH_2X$, —$CH_2CH_2CHXCHX_2$, —$CH_2CH_2CHXCX_3$, —$CH_2CH_2CX_2CH_3$, —$CH_2CH_2CX_2CH_2X$, —$CH_2CH_2CX_2CHX_2$, —$CH_2CH_2CX_2CX_3$, —$CH_2CHXCX_2CH_3$, —$CH_2CHXCX_2CH_2X$, —$CH_2CHXCX_2CHX_2$, and —$CH_2CHXCX_2CX_3$, wherein X is a halogen selected from fluorine, chlorine, bromine, and iodine.

The content of the carbonate compound present in the additive package of the electrolyte solution is not particularly limited and may vary widely. In one embodiment, the electrolyte solution comprises from 35 wt. % to 90 wt. % carbonate compound, e.g., from 35 wt. % to 75 wt. %, from 35 wt. % to 70 wt. %, from 35 wt. % to 68 wt. %, from 35 wt. % to 65 wt. %, from 40 wt. % to 75 wt. %, from 40 wt. % to 72 wt. %, from 40 wt. % to 70 wt. %, from 40 wt. % to 68 wt. %, from 40 wt. % to 65 wt. %, from 45 wt. % to 75 wt. %, from 45 wt. % to 72 wt. %, from 45 wt. % to 70 wt. %, from 45 wt. % to 68 wt. %, from 45 wt. % to 65 wt. %, from 50 wt. % to 75 wt. %, from 50 wt. % to 72 wt. %, from 50 wt. % to 70 wt. %, from 50 wt. % to 68 wt. %, or from 50 wt. % to 65 wt. %, In terms of lower limits the additive package of the electrolyte solution may comprise greater than 35 wt. % carbonate compound, e.g., greater than 40 wt. %, greater than 45 wt. %, or greater than 50 wt. %. In terms of upper limits, the additive package of the electrolyte solution may comprise less than 90 wt. % carbonate compound, e.g., less than 75 wt. %, less than 72 wt. %, less than 70 wt. %, less than 68 wt. %, or less than 65 wt. %.

In some cases, the carbonate compound may be characterized in terms of weight percentage of the total electrolyte solution. For example, the electrolyte solution may comprise from 0.01 wt % to 10 wt % carbonate compound, e.g., from 0.05 wt % to 7 wt %, from 0.1 wt % to 5 wt %, from 0.1 wt % to 4 wt %, from 0.5 wt % to 5 wt %, from 0.5 wt % to 3 wt %, or from 0.5 wt % to 2.5 wt %. In terms of upper limits, the electrolyte solution may comprise less than 10 wt % carbonate compound, e.g., less than 7 wt %, less than 5 wt %, less than 3 wt %, less than 2.5 wt %, less than 1.5 wt %, or less than 1 wt %. In terms of lower limits, the electrolyte solution may comprise greater than 0.01 wt % carbonate compound, e.g., greater than 0.05 wt %, greater than 0.08 wt %, greater than 0.1 wt %, greater than 0.3 wt %, greater than 0.5 wt %, or greater than 1 wt %.

Low VC/EC

As noted above, it has been found that the content and structure (linear vs. cyclic, symmetric vs. asymmetric) of the carbonate compound in the electrolyte solution, along with the presence of the nitrile compound, provides for the surprising chemical characteristics and performance features disclosed above. Thus, the specific synergistic combinations of linear, cyclic, symmetric, and asymmetric carbonates contribute to the unexpected performance features.

Symmetric means that the compound can be bisected and the two sides that result will be mirror images of one another. Asymmetric means that the compound can be bisected and the two sides that result will not be mirror images of one another.

In some embodiments, the electrolyte composition has low cyclic carbonate content (CCC). The carbonate compound comprises cyclic carbonates and these are employed in specific amounts. In some cases, this cyclic carbonate may include cyclic carbonate that is employed as a base solvent and an additive component. For example, the electrolyte solution may comprise from 0.01 wt % to 40 wt % cyclic carbonate compound, e.g., from 0.05 wt % to 30 wt %, from 0.1 wt % to 30 wt %, from 0.1 wt % to 30 wt %, from 0.1 wt % to 25 wt %, from 0.5 wt % to 30 wt %, or from 0.5 wt % to 25 wt %. In terms of upper limits, the electrolyte solution may comprise less than 40 wt % carbonate compound, e.g., less than 30 wt %, less than 25 wt %, less than 20 wt %, less than 15 wt %, less than 10 wt %, or less than 5 wt %. The cyclic carbonate may comprise VC and/or EC (and/or FEC), and the VC and/or EC (and/or FEC) is present in these amounts. In some cases the cyclic carbonate comprises EC, and the EC is present in these low amounts. In some cases, the electrolyte solution may comprise no cyclic carbonate compound, e.g., no EC. In some cases, where FEC is present, the electrolyte solutions comprise less than 7 wt % FEC, e.g., less than 6 wt %, less than 5 wt %, less than 4 wt %, less than 3 wt %, less than 2 wt %, or less than 1 wt %.

High DMC/DEC

In some cases, the carbonate compound has high symmetric, linear carbonates content. The carbonate compound comprises symmetric, linear carbonates and these are employed in specific amounts. In some cases, this symmetric, linear carbonate may include symmetric, linear carbonate that is employed as a base solvent. For example, the electrolyte solution may comprise from 19 wt % to 90 wt % symmetric, linear carbonate, e.g., from 19 wt % to 85 wt %, from 20 wt % to 85 wt %, from 20 wt % to 80 wt %, from 19 wt % to 80 wt %, from 20 wt % to 75 wt %, or from 25 wt % to 75 wt %. In terms of lower limits, the electrolyte solution may comprise greater than 15 wt % symmetric, linear carbonate, e.g., greater than 18 wt %, greater than 19 wt %, greater than 20 wt %, greater than 22 wt %, greater than 25 wt %, greater than 30 wt %, greater than 40 wt %, greater than 50 wt %, or greater than 60 wt %. The symmetric, linear carbonate may comprise DEC and/or DMC, and the DEC and/or DMC is present in these amounts. In some cases the symmetric, linear carbonate comprises DEC, and the DEC is present in these high amounts. The use of these higher amounts have been shown contribute to the aforementioned viscosity, flash point, and impedance benefits vs. electrolyte solutions that comprise little if any symmetric, linear carbonate, e.g., DEC and/or DMC. For example, unexpectedly, in has been found that the use of higher amounts of symmetric, linear carbonate (in combination with the trinitrile compound) increases flash point/dielectric constant without negatively affecting viscosity.

Low EMC

In some cases, the electrolyte solution may include (low amounts of) asymmetric, (linear) carbonates, e.g., EMC, that is employed as a base solvent. For example, the electrolyte solution may comprise from 0.01 wt % to 50 wt % asymmetric, (linear) carbonates, e.g., from 0.05 wt % to 45 wt %, from 0.1 wt % to 40 wt %, from 0.1 wt % to 35 wt %, from 0.1 wt % to 25 wt %, from 0.5 wt % to 35 wt %, or from 0.5 wt % to 25 wt %. In terms of upper limits, the electrolyte solution may comprise less than 50 wt % asymmetric, (linear) carbonates, e.g., less than 45 wt %, less than 40 wt %, less than 35 wt %, less than 30 wt %, less than 25 wt %, or less than 10 wt %. The asymmetric, (linear) carbonates may comprise EMC and may be present in these amounts. In some cases, the electrolyte solution may comprise no asymmetric, (linear) carbonate, e.g., no EMC. Here, the use of lower amounts of asymmetric, linear carbonate (in combination with the trinitrile compound) advantageously contributes to lower viscosity of the electrolyte solution without sacrificing flash point and dielectric constant performance.

The content of the carbonate compound may also be described relative to the content of the trinitrile compound. In one embodiment, the weight ratio of the carbonate compound to the trinitrile compound is from 0.5:1 to 5:1, e.g., from 0.5:1 to 4:1, from 0.5:1 to 3.5:1, from 0.5:1 to 3:1, from 0.5:1 to 2.5:1, from 0.75:1 to 5:1, from 0.75:1 to 4:1, from 0.75:1 to 3.5:1, from 0.75:1 to 3:1, from 0.75:1 to 2.5:1, from 1:1 to 5:1, from 1:1 to 4:1, from 1:1 to 3.5:1, from 1:1 to 3:1, from 1:1 to 2.5:1, from 1.25:1 to 5:1, from 1.25:1 to 4:1, from 1.25:1 to 3.5:1, from 1.25:1 to 3:1, from 1.25:1 to 2.5:1, from 1.5:1 to 5:1, from 1.5:1 to 4:1, from 1.5:1 to 3.5:1, from 1.5:1 to 3:1, or from 1.5:1 to 2.5:1. In terms of lower limits, the weight ratio of the carbonate compound to the trinitrile compound may be greater than or equal to 0.5:1, e.g., greater than or equal to 0.75:1, greater than or equal to 1:1, greater than or equal to 1.25:1, or greater than or equal to 1.5:1. In terms of upper limits, the weight ratio of the carbonate compound to the trinitrile compound may be less than or equal to or equal to 5:1, e.g., less than or equal to 4:1, less than or equal to 3.5:1, less than or equal to 3:1, or less than or equal to 2.5:1.

Sulfonate Compound

In some embodiments, the electrolyte solutions further comprise a sulfonate compound. The sulfonate compound may be any ester of sulfonic acid. As such, the sulfonate compound includes at least one functional group R'SO$_2$OR", wherein R' and R" are each any organic functional group (e.g., an alkyl group, an alkenyl group, or an aryl group). For example, R' and R" may independently be a methyl group, an ethyl group, a propyl group, a butyl group, a pentyl group, a hexyl group, a phenyl group, a benzyl group, a tolyl group.

In some embodiments, R' and R" form a carbon bridge. Said another way, in some embodiments, the sulfonate compound is a cyclic sulfonic ester, or sultone. For example, the sulfonate compound may comprise a substituted or unsubstituted bridge of three carbons (e.g., 1,3-propane sultone), four carbons (e.g., 1,4-butane sultone), or five carbons (e.g., 1,5-pentane sultone).

In some embodiments, the sulfonate compound is disulfonate ester. As such, the sulfonate compound includes two functional groups R'SO$_2$OR", each of which may be the same or different, wherein R' and R" are each any organic functional group, e.g., as described above. In some embodiments, the sulfonate compound is a cyclic disulfonate ester. In terms of chemical structures, the sulfonate compound of these embodiments may have the structure:

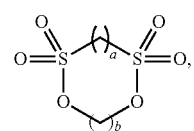

wherein a and b are independently from 1 to 4. In some embodiments, for example, the sulfonate compound may be methylene methanedisulfonate, methylene ethanedisulfonate, methylene propanedisulfonate, methylene butanedisulfonate, ethylene methanedisulfonate, ethylene ethanedisulfonate, ethylene propanedisulfonate, ethylene butanedisulfonate, propylene methanedisulfonate, propylene ethanedisulfonate, propylene propanedisulfonate, propylene butanedisulfonate, butylene methanedisulfonate, butylene ethanedisulfonate, butylene propanedisulfonate, or butylene butanedisulfonate.

The content of the sulfonate compound present in the additive package of the electrolyte solution is not particularly limited and may vary widely. In one embodiment, the electrolyte solution comprises from 15 wt. % to 40 wt. % sulfonate compound, e.g., from 15 wt. % to 37 wt. %, from 15 wt. % to 35 wt. %, from 15 wt. % to 32 wt. %, from 15 wt. % to 30 wt. %, from 18 wt. % to 40 wt. % sulfonate compound, from 18 wt. % to 37 wt. %, from 18 wt. % to 35 wt. %, from 18 wt. % to 32 wt. %, from 18 wt. % to 30 wt. %, from 20 wt. % to 40 wt. % sulfonate compound, e.g., from 20 wt. % to 37 wt. %, from 20 wt. % to 35 wt. %, from 20 wt. % to 32 wt. %, from 20 wt. % to 30 wt. %, from 22 wt. % to 40 wt. % sulfonate compound, e.g., from 22 wt. % to 37 wt. %, from 22 wt. % to 35 wt. %, from 22 wt. % to 32 wt. %, from 22 wt. % to 30 wt. %, from 24 wt. % to 40 wt. % sulfonate compound, e.g., from 24 wt. % to 37 wt. %, from 24 wt. % to 35 wt. %, from 24 wt. % to 32 wt. %, or from 24 wt. % to 30 wt. %. In terms of lower limits the electrolyte solution may comprise greater than 15 wt. % sulfonate compound, e.g., greater than 18 wt. %, greater than 20 wt. %, greater than 22 wt. %, or greater than 24 wt. %. In terms of upper limits, the electrolyte solution may comprise less than 40 wt. % sulfonate compound, e.g., less than 37 wt. %, less than 35 wt. %, less than 32 wt. %, or less than 30 wt. %.

In some cases, the sulfonate compound may be characterized in terms of weight percentage of the total electrolyte solution. For example, the electrolyte solution may comprise the sulfonate compound in accordance with the compositional ranges and limits mentioned above with respect to the trinitrile compound and/or the carbonate compound.

The content of the sulfonate compound may also be described relative to the content of the trinitrile compound. In one embodiment, the weight ratio of the sulfonate compound to the trinitrile compound is from 0.1:1 to 3:1, e.g., from 0.1:1 to 2.75:1, from 0.1:1 to 2.5:1, from 0.1:1 to 2:1, from 0.1:1 to 1.75:1, from 0.25:1 to 3:1, from 0.25:1 to 2.75:1, from 0.25:1 to 2.5:1, from 0.25:1 to 2:1, from 0.25:1 to 1.75:1, from 0.5:1 to 3:1, from 0.5:1 to 2.75:1, from 0.5:1 to 2.5:1, from 0.5:1 to 2:1, from 0.5:1 to 1.75:1, from 0.75:1 to 3:1, from 0.75:1 to 2.75:1, from 0.75:1 to 2.5:1, from 0.75:1 to 2:1, from 0.75:1 to 1.75:1, from 0.9:1 to 3:1, from 0.9:1 to 2.75:1, from 0.9:1 to 2.5:1, from 0.9:1 to 2:1, or from 0.9:1 to 1.75:1. In terms of lower limits, the weight ratio of the sulfonate compound to the trinitrile compound may be greater than or equal to 0.1:1, e.g., greater than or equal to 0.25:1, greater than or equal to 0.5:1, greater than or equal to 0.75:1, or greater than or equal to 0.9:1. In terms of upper limits, the weight ratio of the sulfonate compound to the trinitrile compound may be less than or equal to or equal to 3:1, e.g., less than or equal to 2.75:1, less than or equal to 2.5:1, less than or equal to 2:1, or less than or equal to 1.75:1.

The content of the sulfonate compound may also be described relative to the content of the carbonate compound. In one embodiment, the weight ratio of the carbonate compound to the sulfonate compound is from 0.5:1 to 5:1, e.g., from 0.5:1 to 4:1, from 0.5:1 to 3.5:1, from 0.5:1 to 3:1, from 0.5:1 to 2.5:1, from 0.75:1 to 5:1, from 0.75:1 to 4:1, from 0.75:1 to 3.5:1, from 0.75:1 to 3:1, from 0.75:1 to 2.5:1, from 1:1 to 5:1, from 1:1 to 4:1, from 1:1 to 3.5:1, from 1:1 to 3:1, from 1:1 to 2.5:1, from 1.25:1 to 5:1, from 1.25:1 to 4:1, from 1.25:1 to 3.5:1, from 1.25:1 to 3:1, from 1.25:1 to 2.5:1, from 1.5:1 to 5:1, from 1.5:1 to 4:1, from 1.5:1 to 3.5:1, from 1.5:1 to 3:1, or from 1.5:1 to 2.5:1. In terms of lower limits, the weight ratio of the carbonate compound to the sulfonate compound may be greater than or equal to 0.5:1, e.g., greater than or equal to 0.75:1, greater than or equal to 1:1, greater than or equal to 1.25:1, or greater than or equal to 1.5:1. In terms of upper limits, the weight ratio of the carbonate compound to the sulfonate compound may be less than or equal to or equal to 5:1, e.g., less than or equal to 4:1, less than or equal to 3.5:1, less than or equal to 3:1, or less than or equal to 2.5:1

Base Solvent

The base solvent is the solvent into which the ionic component is dissolved. The base solvent may vary widely and many base solvents are known.

The base solvent is a non-aqueous organic solvent. The non-aqueous organic solvent serves as a medium for transmitting ions taking part in the electrochemical reaction of the battery. In some cases, specific base solvent components, e.g., carbonates, may be present at the ranges and limit discussed above, e.g., for DEC, DMC, EC, and VC. The use of the particular base solvent components, as discussed above, contributes to the unexpected performance benefits described herein.

The non-aqueous organic solvent may include a carbonate-based, ester-based, ether-based, ketone-based, alcohol-based, or aprotic solvent. Examples of carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, and caprolactone, as well as other carbonates mentioned above with respect to the additives. Examples of the ether-based solvent include dibutyl ether, tetraglyme, diglyme, dimethoxyethane, 2-methyltetrahydrofuran and tetrahydrofuran. Examples of the ketone-based solvent include cyclohexanone. Examples of the alcohol-based solvent include ethyl alcohol, isopropyl alcohol. Examples of the aprotic solvent include nitriles such as R—CN (where R is a $C_2$ to $C_{20}$ linear, branched, or cyclic hydrocarbon group including a double bond, an aromatic ring, or an ether bond), amides such as dimethylformamide, dioxolanes such as 1,3-dioxolane, sulfolanes.

A single non-aqueous organic solvent may be used, or a mixture of solvents may be used. When a mixture of organic solvents is used, the mixing ratio can be controlled in accordance with the ranges and limits discussed herein.

Aromatic hydrocarbon-based organic solvents may also be employed. Examples of hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

Ionic Component

The electrolyte solutions also include an ionic component, e.g., a lithium salt.

The ionic component may be dissolved in the base solvent. The ionic component supplies lithium ions in the battery, enables the basic operation of the rechargeable lithium battery, and improves lithium ion transportation between the positive and negative electrodes. Examples of the lithium salt include supporting electrolytic salts, such as $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bis(oxalato) borate, LiBOB), or a combination thereof.

The lithium salt may be used in a concentration ranging from about 0.1 M to about 2.0 M, e.g., from 0.5M to 2.0M, or from 0.8M to 1.6M.

Secondary Cell

As noted above, the electrolyte solutions described herein are contemplated for use in a secondary cell. The secondary cell comprises an anode, a cathode, and any electrolyte solution described herein.

The anode is an electrode that releases electrons during discharge. The anode of the secondary cells for use with the electrolyte solutions described herein preferably comprises graphite.

The cathode is an electrode that attracts electrons released during discharge. The cathode of the secondary cells for use with the electrolyte solutions described herein has a cathode active material. The cathode active material comprises a lithium-containing transition metal composite oxide. For example, the cathode active material may comprise lithium cobalt oxide ($LiCoO_2$), spinel lithium manganate ($LiMn_2O_4$), cobalt-nickel-manganese-containing lithium composite oxides, and/or aluminum-nickel-cobalt-containing lithium composite oxides.

In some embodiments, the lithium-containing transition metal composite oxide has a chemical formula $LiNi_xMn_yCo_zO_2$, wherein x, y, and z are independently selected from 0 to 8. In some embodiments, for example, x is 6, y is 2, and z is 2, such that the lithium-containing transition metal composite oxide has a chemical formula $LiNi_6Mn_2Co_2O_2$. In other embodiments, for example, x is 8, y is 1, and z is 1, such that the lithium-containing transition metal composite oxide has a chemical formula $LiNi_8MnCoO_2$.

In some embodiments, the lithium-containing transition metal composite oxide has a chemical formula $LiNi_xCo_yAl_zO_2$, wherein x, y, and z are independently selected from 0 to 8.

Performance Characteristics

The electrolyte solutions of the present disclosure have surprisingly been found to improve the function of secondary cells, e.g., lithium-ion batteries. In particular, the electrolyte solutions of the present disclosure surprisingly demonstrate improvements in various performance characteristics by which secondary cells and/or electrolyte solutions are tested.

As used herein, "greater than" may be interpreted as meaning greater than or equal to and "less than" may be interpreted as meaning less than or equal to.

Voltage Drop

Secondary cells, such as lithium ion batteries, operate by the production of a voltage potential between metals, e.g., the anode and the cathode, in an electrolyte solution. In particular, the difference in electrical potential between the anode and the cathode when disconnected from a circuit produces an open-circuit voltage. The open-circuit voltage may decrease due to internal resistance of the secondary cell; this is typically known as voltage drop. Various factors contribute to voltage drop, e.g., the present inventors have found that voltage drop may be caused by oxidation reactions at the cathode.

High voltage drop is undesirable, because it reduces the open-circuit voltage and thereby the electromotive force. This reduces the efficiency of the secondary cell, e.g., the lithium-ion battery. As such, it is desirable that an electrolyte solution demonstrate low voltage drop. Voltage drop can be tested by conventional means known to those in the art.

In some embodiments, batteries employing the electrolyte solutions described herein demonstrate a voltage drop of less than 0.25 V, e.g., less than 0.22 V, less than 0.2 V, less than 0.18 V, less than 0.16 V, less than 0.14 V, or less than 0.12 V. In terms of lower limits, batteries employing the electrolyte solution may demonstrate a voltage drop greater than 0 V, e.g., greater than 1 mV, greater than 5 mV, greater than 10 mV, greater than 15 mV, or greater than 25 mV. In terms of ranges, the electrolyte solution may demonstrate a voltage drop from 0 V to 0.25 V, e.g., from 0 V to 0.22 V, from 0 V to 0.2 V, from 0 V to 0.18 V, from 0 V to 0.16 V, from 0 V to 0.14 V, from 0 V to 0.12 V, from 1 mV to 0.25 V, from 1 mV to 0.22 V, from 1 mV to 0.2 V, from 1 mV to 0.18 V, from 1 mV to 0.16 V, from 1 mV to 0.14 V, from 1 mV to 0.12 V, from 5 mV to 0.25 V, from 5 mV to 0.22 V, from 5 mV to 0.2 V, from 5 mV to 0.18 V, from 5 mV to 0.16 V, from 5 mV to 0.14 V, from 5 mV to 0.12 V, from 10 mV to 0.25 V, from 10 mV to 0.22 V, from 10 mV to 0.2 V, from 10 mV to 0.18 V, from 10 mV to 0.16 V, from 10 mV to 0.14 V, from 10 mV to 0.12 V, from 15 mV to 0.25 V, from 15 mV to 0.22 V, from 15 mV to 0.2 V, from 15 mV to 0.18 V, from 15 mV to 0.16 V, from 15 mV to 0.14 V, from 15 mV to 0.12 V, from 25 mV to 0.25 V, from 25 mV to 0.22 V, from 25 mV to 0.2 V, from 25 mV to 0.18 V, from 25 mV to 0.16 V, from 25 mV to 0.14 V, or from 25 mV to 0.12 V.

Gas Generation Value

The electrochemical reactions the proceed during preparation and/or operation of a secondary cell, e.g., the formation of the solid electrolyte interface in a lithium ion battery, may result in the formation of gases. For example, gaseous hydrogen and/or gaseous oxygen. In conventional secondary cells, e.g., lead acid batteries, the presence of gases and/or bubbles in the electrolyte solution may be desirable, as it indicates that the secondary cell is reaching a full state-of-charge. The present inventors have found, however, that the formation of gas in certain secondary cells, e.g., lithium ion batteries, contributes to degradation of the secondary cell. For example, the formation of gases may affect the volume of the contents. In the worst case, this can lead to explosion. As such, it may be desirable to develop a secondary cell that produces relatively little gas during preparation and/or operation.

The present inventors have surprisingly found that the electrolyte solutions disclosed herein produce relatively little gas during preparation and/or operation of a secondary cell. In particular, the electrolyte solutions produce relatively little gas during the formation of the solid electrolyte interface in a lithium ion battery. The amount of gas produced during this formation step can be reported as a "gas value." Gas value can be tested by conventional means known to those in the art.

In one embodiment, batteries employing the electrolyte solution demonstrate a gas value less than 4.9 mL, e.g., less than 4.8 mL, less than 4.5 mL, less than 3.8 mL, less than 3 mL, less than 2 mL, less than 1 mL, less than 0.75 mL, or less than 0.3 mL. In terms of lower limits, batteries employing the electrolyte solution may demonstrate a gas value greater than 0 mL, e.g., greater than 0.01 mL, greater than 0.02 mL, greater than 0.03 mL, or greater than 0.04 mL. In terms of ranges, the electrolyte solution may demonstrate a gas value from 0 mL to 3 mL, e.g., from 0 mL to 2 mL, from 0 mL to 1 mL, from 0 mL to 0.75 mL, from 0 mL to 0.3 mL, from 0.01 mL to 3 mL, from 0.01 mL to 2 mL, from 0.01 mL to 1 mL, from 0.01 mL to 0.75 mL, from 0.01 mL to 0.3 mL, from 0.02 mL to 3 mL, from 0.02 mL to 2 mL, from 0.02 mL to 1 mL, from 0.02 mL to 0.75 mL, from 0.02 mL to 0.3 mL, from 0.03 mL to 3 mL, from 0.03 mL to 2 mL, from 0.03 mL to 1 mL, from 0.03 mL to 0.75 mL, from 0.03 mL to 0.3 mL, from 0.04 mL to 3 mL, from 0.04 mL to 2 mL, from 0.04 mL to 1 mL, from 0.04 mL to 0.75 mL, or from 0.04 mL to 0.3 mL. The batteries may achieve these results when operated at 4.2V, 4.3V, 4.4V, or 4.48 volts.

Coulombic Efficiency

Secondary cells are known to have inefficiencies such that the energy retrieved from the secondary is less than the charge that had been put in to the secondary cell. For example, parasitic reactions that occur within the secondary cell may prevent high efficiency. Heavy loading of the secondary cell may also reduce its efficiency. This also contributes to battery strain by reducing cycle life. Efficiency of a secondary cell is commonly measured as coulombic efficiency (sometimes referred to as faradic efficiency). Coulombic efficiency (CE) is the ratio of the total charge extracted from the battery to the total charge put into the battery over a full cycle. CE can be tested by conventional means known to those in the art.

Conventional lithium ion batteries are known to have relatively high CE, but the efficiency of the batteries is limited by the conditions under which the batteries are charged. In particular, high CE in conventional lithium ion batteries requires charging at a moderate current and at relatively low temperatures. Furthermore, conventional lithium ion typically have low CE at initial cycling and only exhibit improved CE after cycling. As such, there is a need for improved secondary cells, e.g., lithium ion batteries, that exhibit high initial CE.

The present inventors have found the CE of a secondary cell, e.g., a lithium ion battery, can be improved by selection of the electrolyte solution. In particular, batteries employing the electrolyte solutions described herein exhibit relatively high CE in an initial cycle. In some embodiments, batteries employing the electrolyte solution exhibits an average CE greater than 0.8 in the first cycle, e.g., greater than 0.82, greater than 0.84, greater than 0.85, greater than 0.86, or greater than 0.88. In terms of upper limits, the electrolyte solution may exhibit an average CE less than or equal to 1.0 in the first cycle, e.g., less than 0.999, less than 0.998, less than 0.997, or less than 0.996. In terms of ranges, batteries employing the electrolyte solution may exhibit an average CE from 0.8 to 1.0 in the first cycle, e.g., from 0.8 to 0.999, from 0.8 to 0.998, from 0.8 to 0.997, from 0.8 to 0.996, from 0.82 to 1.0, from 0.82 to 0.999, from 0.82 to 0.998, from 0.82 to 0.997, from 0.82 to 0.996, from 0.84 to 1.0, from 0.84 to 0.999, from 0.84 to 0.998, from 0.84 to 0.997, from 0.84 to 0.996, from 0.86 to 1.0, from 0.86 to 0.999, from 0.86 to 0.998, from 0.86 to 0.997, from 0.86 to 0.996, from 0.88 to 1.0, from 0.88 to 0.999, from 0.88 to 0.998, from 0.88 to 0.997, or from 0.88 to 0.996.

The electrolyte solutions described herein also exhibit relatively high CE in later cycles. In some embodiments, batteries employing the electrolyte solution exhibits an average CE greater than 0.9 in the twentieth cycle, e.g., greater than 0.92, greater than 0.94, greater than 0.96, greater than 0.98, greater than 0.99, greater than 0.995, greater than 0.996, or greater than 0.997. In terms of upper limits, batteries employing the electrolyte solution may exhibit an average CE less than or equal to 1.0 in the twentieth cycle, e.g., less than 0.999, less than 0.998, less than 0.997, or less than 0.996. In terms of ranges, batteries employing the electrolyte solution may exhibit an average CE from 0.9 to 1.0 in the twentieth cycle, e.g., from 0.9 to 0.999, from 0.9 to 0.998, from 0.9 to 0.997, from 0.9 to 0.996, from 0.92 to 1.0, from 0.92 to 0.999, from 0.92 to 0.998, from 0.92 to 0.997, from 0.92 to 0.996, from 0.94 to 1.0, from 0.94 to 0.999, from 0.94 to 0.998, from 0.94 to 0.997, from 0.94 to 0.996, from 0.96 to 1.0, from 0.96 to 0.999, from 0.96 to 0.998, from 0.96 to 0.997, from 0.96 to 0.996, from 0.98 to 1.0, from 0.98 to 0.999, from 0.98 to 0.998, from 0.98 to 0.997, or from 0.98 to 0.996. The batteries may achieve these results when operated at specific voltages, e.g., 4.2V, 4.3V, 4.4V, or 4.48V.

Impedance (Growth)

As noted above, secondary cells, e.g., lithium ion batteries, experience inefficiencies in operation. One source of inefficiency is impedance, which is a combination of internal resistance and reactance. The internal resistance of a secondary cell battery is made up of two components: electrical (or ohmic) resistance and ionic resistance. Electrical resistance is a measure of the opposition to current flow in an electrical circuit. Ionic resistance is a measure of opposition to current flow due to internal factors, such as electrode surface area and electrolyte conductivity. Impedance growth is typically reported as the difference between the average charge voltage and the average discharge voltage of a cycle. Impedance growth can be tested by conventional means known to those in the art.

The internal resistance of a secondary cell, e.g., a lithium ion battery, typically increases with time and/or cycling. Because lower internal resistance generally indicates a higher capacity and efficiency, this increase in internal resistance contributes to degradation of the secondary cell.

The present inventors have surprisingly found that the electrolyte solutions reduce the growth of impedance with time. In some embodiments, batteries employing the electrolyte solution exhibits an impedance growth of less than 20% over 25 cycles, e.g., less than 18%, less than 16%, less than 14%, or less than 12%. In terms of lower limits, batteries employing the electrolyte solution may exhibit an impedance growth of greater than 0% over 25 cycles, e.g., greater than 2%, greater than 4%, greater than 6%, or greater than 8%. In terms of ranges, batteries employing the electrolyte solution may exhibit an impedance growth from 0% to 20% over 25 cycles, e.g., from 0% to 18%, from 0% to 16%, from 0% to 14%, from 0% to 12%, from 2% to 20% over 25 cycles, from 2% to 18%, from 2% to 16%, from 2% to 14%, from 2% to 12%, from 4% to 20% over 25 cycles, e.g., from 4% to 18%, from 4% to 16%, from 4% to 14%, from 4% to 12%, from 6% to 20% over 25 cycles, e.g., 6% to 18%, from 6% to 16%, from 6% to 14%, from 6% to 12%, from 8% to 20% over 25 cycles, e.g., from 8% to 18%, from 8% to 16%, from 8% to 14%, or from 8% to 12%.

Capacity Retention

In some embodiments, when operated in a battery, the battery may demonstrate a capacity retention, greater than 95, e.g., greater than 96, greater than 97, greater than 98, or greater than 99.

Capacity Fade

In some embodiments, the electrolyte solution demonstrates a capacity fade less than 0.0060, e.g., less than 0.0055, less than 0.0053, less than 0.0050, less than 0.0049, or less than 0.00485. The batteries may achieve these results when operated at specific voltages, e.g., 3.7V or 4.3V, and the measurements may be zeroed to Cycle 2.

Viscosity

In some embodiments, the electrolyte solution has a viscosity less than 1.16 cps, e.g., less than 1.12, less than 1.0, less than 0.98 cps, less than 0.95 cps, less than 0.75 cps, less than 0.70 cps, less than 0.68 cps, less than 0.67 cps, or less than 0.66 cps. This is significantly less than conventional solutions, which have viscosities (significantly) greater than 1.16 cps. In terms of ranges, the electrolyte solution may have a viscosity ranging from 0.50 cps to 1.16 cps, e.g., from 0.55 cps to 0.12 cps, from 0.57 cps to 1.0 cps, or from 0.60 cps to 0.98 cps. Conventional viscosity measurement techniques are well known.

Flash Point

In some embodiments, the electrolyte solution has a flash point greater than 12° C., e.g., greater than 15° C., greater than 16° C., greater than 17° C., greater than 20° C., greater than 22° C., greater than 25° C., greater than 27° C., or greater than 30° C. In terms of ranges, the electrolyte solution may have a flash point ranging from 12° C. to 30° C., e.g., from 17° C. to 30° C., from 23° C. to 30° C., or from 25° C. to 30° C. Conventional flash point measurement techniques are well known.

Polarizability/Dielectric Constant

In some embodiments, the electrolyte solution has high polarizability, e.g., as represented by a high dielectric constant. For example, the electrolyte solution may have a dielectric constant greater than 40, e.g., greater than 45, greater than 48, greater than 50, greater than 52, greater than 55, greater than 57, greater than 60, or greater than 62. This is significantly less than conventional solutions, which have dielectric constants (significantly) less than 40. Conventional dielectric constant measurement techniques are well known.

EXAMPLES

The present disclosure will be further understood by the following examples, which are non-limiting and illustrative.

The following Examples include experimental data from preparation and/or operation of secondary cells comprising electrolyte solutions described herein. Comparative Examples are provided as well to demonstrate the surprising performance advantages of the disclosed electrolyte solutions. In the Examples, electrolyte solutions were prepared by dissolving an ionic component (LiPF$_6$) into a base solvent (EC:EMC:DEC) and adding an additive package (TCH+xyz). The base solvent comprised multiple components, as indicated below. The solvent components were mixed together and the ionic component, e.g., LiPF$_6$ was added thereto. The various additive packages comprising the trinitrile and the carbonate/sulfonate were then added to the respective electrolyte solution. Comparative Examples did not contain trinitrile compounds.

The electrolyte solutions comprised higher content of DEC and/or DMC, e.g., greater than 19 wt %, which in combination with the nitrile compound, provided for the unexpected performance benefits demonstrated herein.

Battery cells were prepared using the electrolyte solutions. The battery cells comprised an anode and a cathode, as well as other conventional components. Unless otherwise specified, the cells were designed for 320 mAh (milliamp-hour) performance. The cells were operated at various voltages, e.g., 4.2V, 4.3V, or 4.4V, and tested for many battery performance properties. As demonstrated below, the disclosed electrolyte solutions provided for unexpected performance benefits when used in combination with many cathode and/or solvent combinations.

Examples 1-6

Battery cells were prepared as discussed above. The compositions of the cathodes, anodes, and electrolyte solutions are provided in Table 1, below. 1.2 M LiPF$_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives, e.g., succinonitrile, in the additive package. These additives were dosed 2× higher than the TCH.

The cells were operated at various voltages and were measured for first cycle coulombic efficiency, which describes the charge efficiency by which electrons are transferred in batteries. In some cases, CE represents the ratio of the total charge extracted from the battery to the total charge put into the battery over a full cycle.

The results are shown in Table 1.

TABLE 1

| | Cathode | Anode | Additive Package 1 | V | First Cycle Coul. Eff. |
|---|---|---|---|---|---|
| Ex. 1 | NMC 622 | Graphite | TCH 1; FEC 2 | 4.2 | 0.860 |
| Comp. 1 | NMC 622 | Graphite | FEC 2; SN 1 | 4.2 | 0.853 |
| Ex. 2 | NMC 622 | Graphite | TCH 1; FEC 2 | 4.3 | 0.871 |
| Comp. 2 | NMC 622 | | FEC 2; SN 1 | 4.3 | 0.868 |
| Ex. 3 | NMC 622 | Graphite | TCH 1; FEC 2 | 4.4 | 0.875 |
| Comp. 3 | NMC 622 | | FEC 2; SN 1 | 4.4 | 0.868 |
| Ex. 4 | NMC 811 | Graphite | TCH 1; FEC 2 | 4.2 | 0.872 |
| Comp. 4 | NMC 811 | Graphite | FEC 2; SN 1 | 4.2 | 0.865 |
| Ex. 5 | NCA 811 | Graphite | TCH 1; FEC 2 | 4.2 | 0.870 |
| Comp. 5 | NCA 811 | Graphite | FEC 2; SN 1 | 4.2 | 0.861 |
| Ex. 6 | NCA 811 | Graphite | TCH 1; VC 2; MMDS 1; | 4.2 | 0.888 |
| Comp. 6 | NCA 811 | Graphite | VC 2; MMDS 1 | 4.2 | 0.886 |

As shown in Table 1, the use of the disclosed electrolyte solutions provided for significant improvements in coulombic efficiency versus similar comparative solutions that did not employ the disclosed electrolyte solutions. The TCH outperformed succinonitrile.

While these differences may seem small in actual value, e.g., thousandths, these differences are notable and significant when assessing battery performance. This is true and applicable to the Tables and Figures discussed herein. In the Figures, even what appear to be slight differences in the graphs are significant improvements in battery performance.

Examples 7-11

Battery cells were prepared as discussed above. The compositions of the cathodes, anodes, and electrolyte solutions are provided in Table 2, below. 1.2 M LiPF$_6$ was dissolved into a base solvent comprising ethylene carbonate (EC), diethyl carbonate (EMC), and vinyl carbonate (VC) at a weight ratio of 30:70:1. Comparative examples include non-TCH additives, e.g., succinonitrile, in the additive package. These additives were dosed 2× higher than the TCH.

The cells were operated at 4.48 volts and were measured for 5 day gas generation, as determined by the volumetric displacement method, and capacity retention, as determined by standard measurements, e.g., the discharge method (these methods were used throughout). Temperature was 50° C. The results are shown in Table 2.

TABLE 2

|  | Cathode | Anode | Additives | V | Gas Generation | Cap. Reten. |
|---|---|---|---|---|---|---|
| Ex. 7 | LCO | Graphite | TCH 1; package 1 | 4.48 | 3.4 | 97 |
| Comp. 7 | LCO | Graphite | SN 2; package 1 | 4.48 | 4.7 | 90 |
| Ex. 8 | LCO | Graphite | TCH 1; package 2 | 4.48 | 4.3 | 97 |
| Comp. 8 | LCO | Graphite | SN 2; package 2 | 4.48 | 5.0 | 97 |
| Ex. 9 | LCO | Graphite | TCH 1; package 3 | 4.48 | 3.1 | 99 |
| Comp. 9 | LCO | Graphite | SN 2; package 3 | 4.48 | 4.0 | 98 |
| Ex. 10 | LCO | Graphite | TCH 1; package 4 | 4.48 | 3.7 | 98 |
| Comp. 10 | LCO | Graphite | SN 2; package 4 | 4.48 | 4.5 | 97 |
| Ex. 11 | LCO | Graphite | TCH 1; package 5 | 4.48 | 3.6 | 98 |
| Comp. 11 | LCO | Graphite | SN 2; package 5 | 4.48 | 4.9 | 96 |

As shown in Table 2, the use of the disclosed electrolyte solutions provided for significant improvements in gas generation as well as capacity retention versus similar comparative solutions that did not employ the disclosed electrolyte solutions. Importantly, as noted above, the non-nitrile (non-TCH) additives were dosed 2× higher than the TCH, yet the TCH electrolytes still outperformed the comparative electrolyte/additives, which made the results even more surprising and beneficial.

Examples 12-17

Battery cells were prepared as discussed above. The compositions of the cathodes, anodes, and electrolyte solutions are provided in Table 3, below. 1.2 M $LiPF_6$ was dissolved into a base solvent comprising ethylene carbonate (EC), diethyl carbonate (EMC), and vinyl carbonate (VC) at a weight ratio of 30:70:1. Comparative examples include non-TCH additives, e.g., propane sultone, in the additive package. These additives were dosed 4× higher than the TCH.

The cells were operated at 4.48 volts and were measured for 5 day gas generation and capacity retention. Temperature was 50° C. The results are shown in Table 3.

TABLE 3

|  | Cathode | Anode | Additives | V | Gas Generation | Cap. Reten. |
|---|---|---|---|---|---|---|
| Ex. 12 | LCO | Graphite | TCH 1; package 1 | 4.48 | 3.4 | 96 |
| Comp. 12 | LCO | Graphite | PS 4; package 1 | 4.48 | 6.3 | 90 |
| Ex. 13 | LCO | Graphite | TCH 1; package 1 | 4.48 | 4.8 | 98 |
| Comp. 13 | LCO | Graphite | PS 4; package 1 | 4.48 | 6.5 | 87 |
| Ex. 14 | LCO | Graphite | TCH 1; package 1 | 4.48 | 4.3 | 96 |
| Comp. 14 | LCO | Graphite | PS 4; package 1 | 4.48 | 5.1 | 91 |
| Ex. 15 | LCO | Graphite | TCH 1; package 1 | 4.48 | 3.1 | 100 |
| Comp. 15 | LCO | Graphite | PS 4; package 1 | 4.48 | 4.7 | 100 |
| Ex. 16 | LCO | Graphite | TCH 1; package 1 | 4.48 | 3.7 | 96 |
| Comp. 16 | LCO | Graphite | PS 4; package 1 | 4.48 | 6.7 | 88 |
| Ex. 17 | LCO | Graphite | TCH 1; package 1 | 4.48 | 3.6 | 96 |
| Comp. 17 | LCO | Graphite | PS 4; package 1 | 4.48 | 6.8 | 89 |

As shown in Table 3, the use of the disclosed electrolyte solutions provided for significant improvements in gas generation as well as capacity retention versus similar comparative solutions that did not employ the disclosed electrolyte solutions. Importantly, as noted above, The non-nitrile (non-TCH) additives were dosed 4× higher than the TCH, yet the TCH electrolytes still outperformed the comparative electrolyte/additives, which made the results even more surprising and beneficial.

Examples 18-26

Battery cells were prepared as discussed above. The compositions of the cathodes, anodes, and electrolyte solutions are provided in Table 4, below. 1.2 M $LiPF_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at various voltages and were measured for gas generation, as determined by the volumetric displacement method. Temperature was 40° C. Voltage range was 2.8V-4.2V. C/20 charge and discharge were employed. The upper limit was 48 h OCV. The results are shown in Table 4.

TABLE 4

|  | Cathode | Anode | Additives | V | Gas Generation |
|---|---|---|---|---|---|
| Ex. 18 | NMC 622 | Graphite | TCH 1; VC 2 | 4.3 | 0.40 |
| Comp. 18 | NMC 622 | Graphite | VC 2 | 4.3 | 0.48 |

TABLE 4-continued

|  | Cathode | Anode | Additives | V | Gas Generation |
|---|---|---|---|---|---|
| Ex. 19 | NMC 622 | Graphite | TCH 1; VC 2; MMDS 1 | 4.3 | 0.49 |
| Comp. 19 | NMC 622 | Graphite | VC 2; MMDS 1 | 4.3 | 0.58 |
| Ex. 20 | NMC 622 | Graphite | TCH 1; FEC 2 | 4.3 | 1.15 |
| Comp. 20 | NMC 622 | Graphite | SN 1; FEC 2 | 4.3 | 1.32 |
| Ex. 21 | NMC 811 | Graphite | TCH 1; VC 2 | 4.2 | 0.43 |
| Comp. 21 | NMC 811 | Graphite | VC 2 | 4.2 | 0.62 |

TABLE 4-continued

|  | Cathode | Anode | Additives | V | Gas Generation |
|---|---|---|---|---|---|
| Ex. 22 | NMC 811 | Graphite | TCH 1; VC 2; MMDS 1 | 4.2 | 0.41 |
| Comp. 22 | NMC 811 | Graphite | VC 2; MMDS 1 | 4.2 | 0.42 |
| Ex. 23 | NMC 811 | Graphite | TCH 1; FEC 2 | 4.2 | 0.82 |
| Comp. 23 | NMC 811 | Graphite | SN 1; FEC 2 | 4.2 | 1.01 |
| Ex. 24 | NMC 811 | Graphite | TCH 1; VC 2 | 4.2 | 0.23 |
| Comp. 24 | NMC 811 | Graphite | VC 2 | 4.2 | 0.50 |
| Ex. 25 | NMC 811 | Graphite | TCH 1; VC 2; MMDS 1 | 4.2 | 0.23 |
| Comp. 25 | NMC 811 | Graphite | VC 2; MMDS 1 | 4.2 | 0.43 |
| Ex. 26 | NMC 811 | Graphite | TCH 1; FEC 2 | 4.2 | 0.81 |
| Comp. 26 | NMC 811 | Graphite | SN 1; FEC 2 | 4.2 | 0.84 |

As shown in Table 4, the use of the disclosed electrolyte solutions provided for significant improvements in gas generation versus similar comparative solutions that did not employ the disclosed electrolyte solutions. The TCH electrolytes outperformed the comparative electrolyte/additives.

Example 27

Battery cells were prepared as discussed above. The compositions of the cathode, anode, and electrolyte solution is provided in Table 5, below. 1.2 M LiPF$_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at various voltages and cycled and were measured for normalized capacity and impedance. The compositions of the components are shown in Table 5. Temperature was 40° C.; voltage range was 2.8V-4.2V. C/5 CCCV charge and C/2 CC discharge were employed. The results are shown in FIGS. 1-6.

TABLE 5

|  | Cathode | Anode | Additives |
|---|---|---|---|
| Ex. 27 | NMC 622 | Graphite | TCH 1; FEC 2 |
| Comp. 27 | NMC 622 | Graphite | SN 1; FEC 2 |

Figure 6:
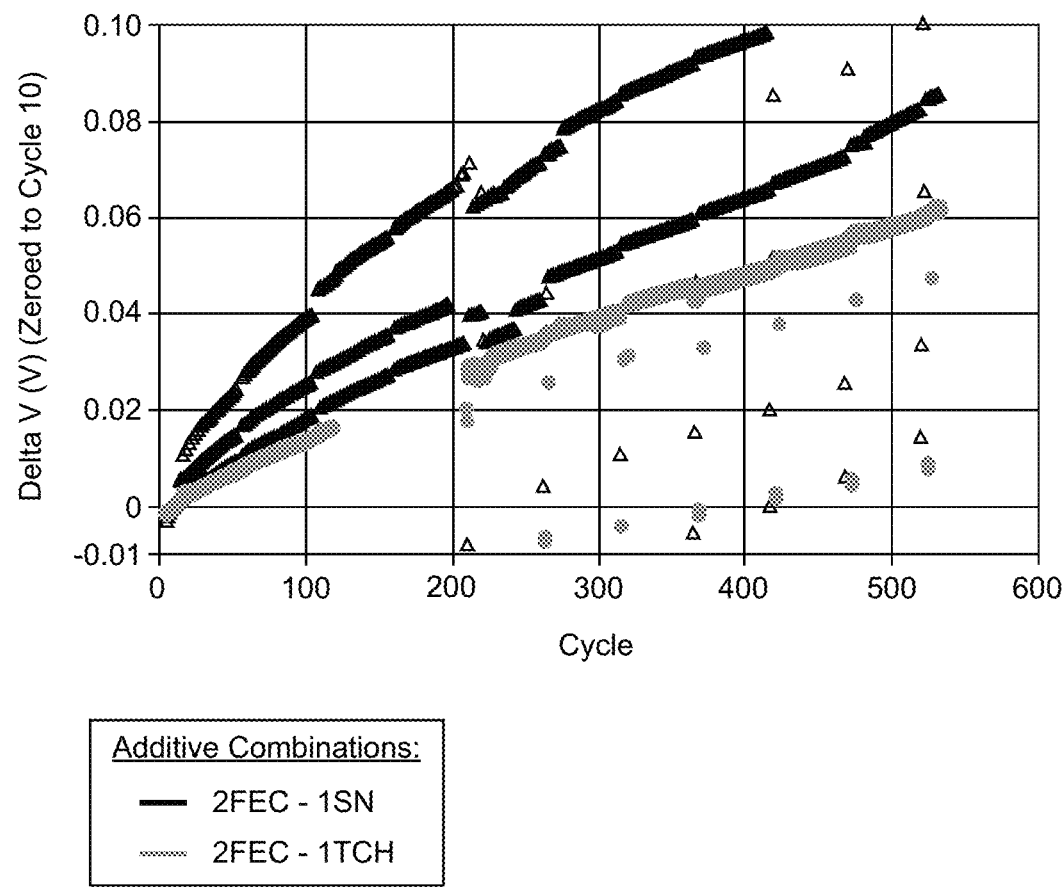
FIG. 6 is a plot of (zeroed) delta V vs. cycles for examples of embodiments of the disclosure and comparative examples.

As shown in FIGS. 1-6, the use of the disclosed electrolyte solutions provided for significant improvements in capacity and delta V (impedance). In particular, the data point comparison on FIG. 6 is particularly stark. The TCH electrolytes outperformed the comparative electrolyte/additives, e.g., in terms of improved capacity retention, impedance control, and capacitance.

Example 28

Battery cells were prepared as discussed above. The compositions of the cathode, anode, and electrolyte solution is provided in Table 6, below. 1.2 M LiPF$_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at various voltages and cycled and were measured for norm capacity and delta V (zeroed to Cycle 10). The compositions of the components are shown in Table 6. Temperature was 40° C.; voltage range was 2.8V-4.2V. C/5 CCCV charge and C/2 CC discharge were employed. The results are shown in FIGS. 7 and 8.

TABLE 6

|  | Cathode | Anode | Additives |
|---|---|---|---|
| Ex. 28 | NMC 811 | Graphite | TCH 1; VC 2 |
| Comp. 28a | NMC 811 | Graphite | VC 2; MMDS 1 |
| Comp. 28a | NMC 811 | Graphite | FEC 2; SN 1 |

Figure 7:
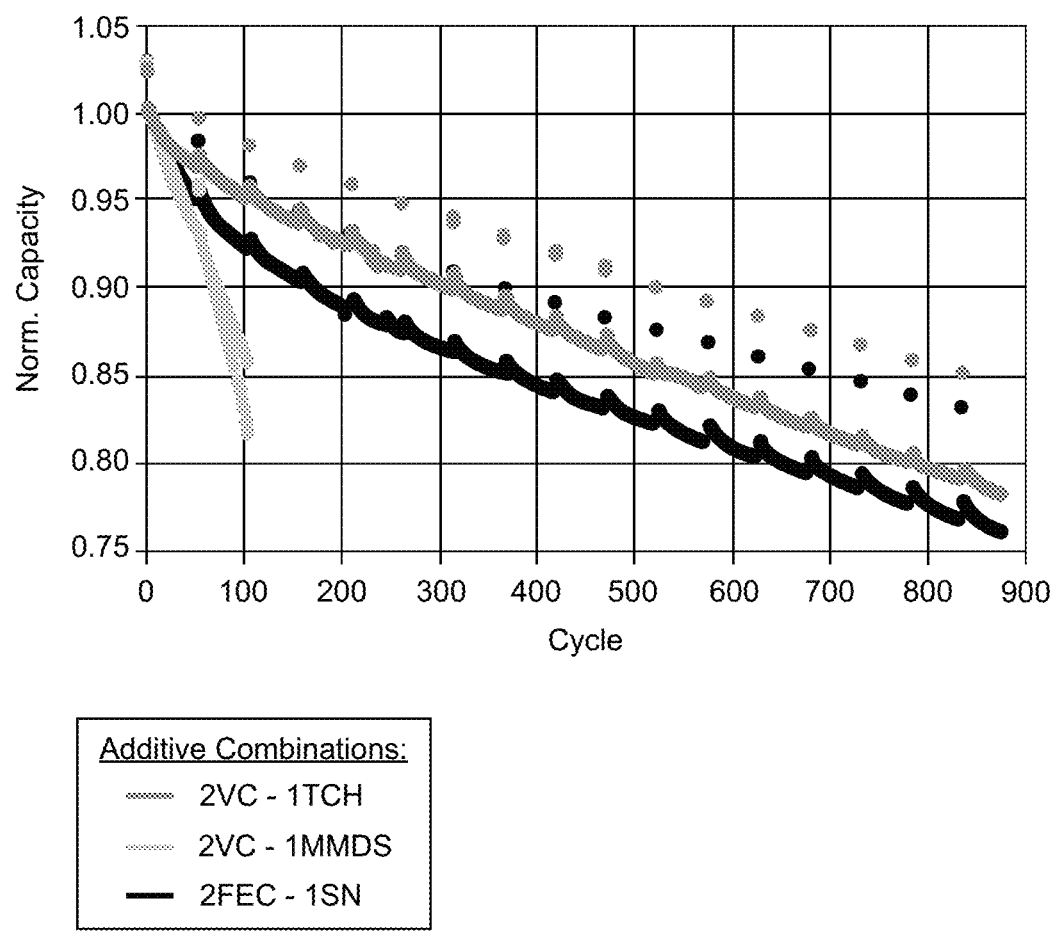
FIG. 7 is a plot of norm. capacity vs. cycles for examples of embodiments of the disclosure and comparative examples.
Figure 8:
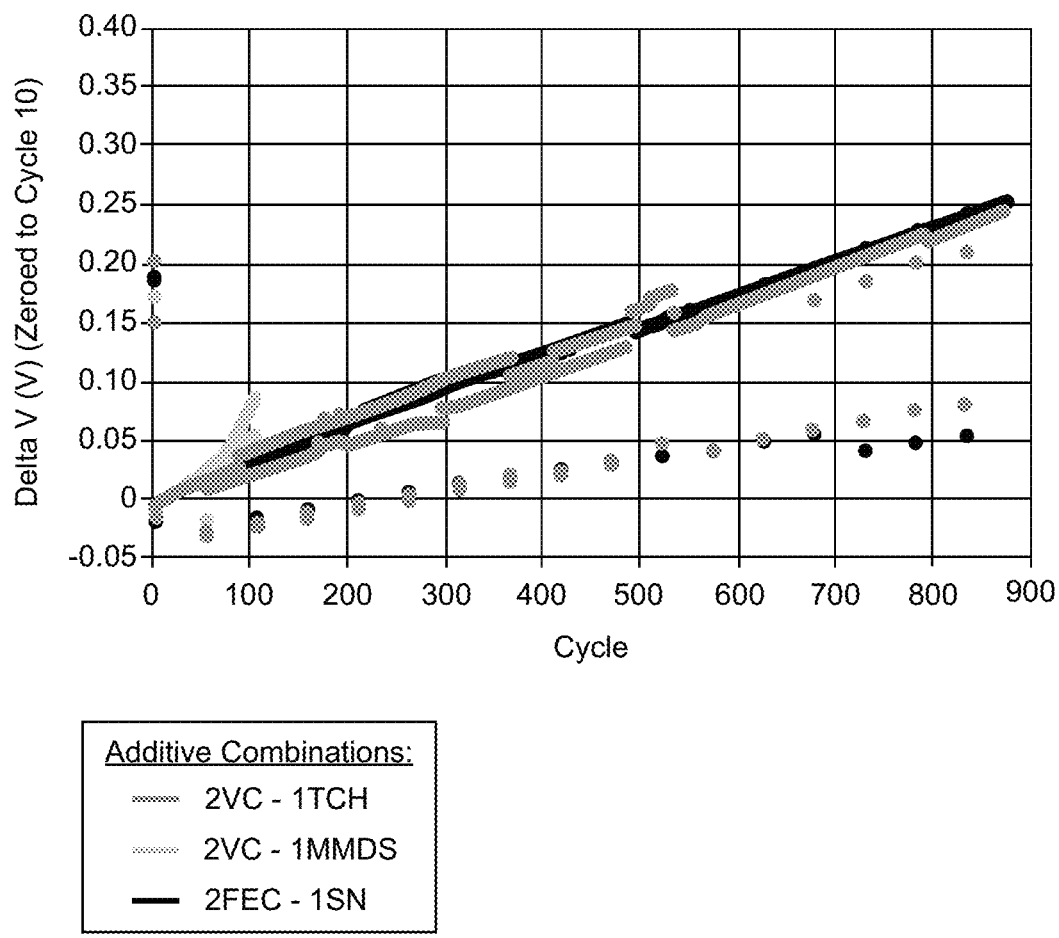
FIG. 8 is a plot of (zeroed) delta V vs. cycles for examples of embodiments of the disclosure and comparative examples.

As shown in FIGS. 7 and 8, the use of the disclosed electrolyte solutions provided for significant improvements in capacity and delta V. In particular, the capacity drop off of the comparative example as indicated by the lower lines is particularly stark. The TCH electrolytes outperformed the comparative electrolyte/additives.

Examples 29 and 30

Battery cells were prepared as discussed above. The compositions of the cathode, anode, and electrolyte solution is provided in Table 7, below. 1.2 M LiPF$_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at various voltages and were measured for capacity fade (zeroed to Cycle 2). The compositions of the components and results are shown in Table 7. Temperature was 40° C.; voltage range was 2.2V-3.7V. C/5 CCCV charge and C/2 CC discharge were employed. The results are shown in Table 7.

TABLE 7

|  | Cathode | Anode | Additives | V | Capacity Fade |
|---|---|---|---|---|---|
| Ex. 29 | LFP | Graphite | TCH 1; VC 2 | 3.7 | 0.0048 |
| Comp. 29 | LFP | Graphite | VC 2 | 3.7 | 0.0052 |
| Ex. 30 | LFP | Graphite | TCH 1; VC 2; PS 1 | 4.3 | 0.0047 |
| Comp. 30 | LFP | Graphite | VC 2; PS 1 | 4.3 | 0.0049 |

As shown in Table 7, the use of the disclosed electrolyte solutions provided for significant improvements in capacity fade. The TCH electrolytes outperformed the comparative electrolyte/additives.

Examples 31 and 32

Battery cells were prepared as discussed above. The compositions of the cathode, anode, and electrolyte solution is provided in Table 8, below. 1.2 M LiPF$_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at 4.3 volts and cycled and were measured for voltage (high temp) and voltage fade, standard voltage measurement devices were employed. Temperature was 60° C. (high temperature); C/5 CCCV charge and C/2 CC discharge were employed. The results are shown in FIGS. 9 and 10.

TABLE 8

|  | Cathode | Anode | Additives | V |
|---|---|---|---|---|
| Ex. 31 | NMC 622 | Graphite | TCH 1; VC 2 | 4.3 |
| Comp. 31 | NMC 622 | Graphite | VC 2 | 4.3 |
| Ex. 32 | NMC 622 | Graphite | TCH 1; VC 2; PS 1 | 4.3 |
| Comp. 32 | NMC 622 | Graphite | VC 2; PS 1 | 4.3 |

Figure 9:
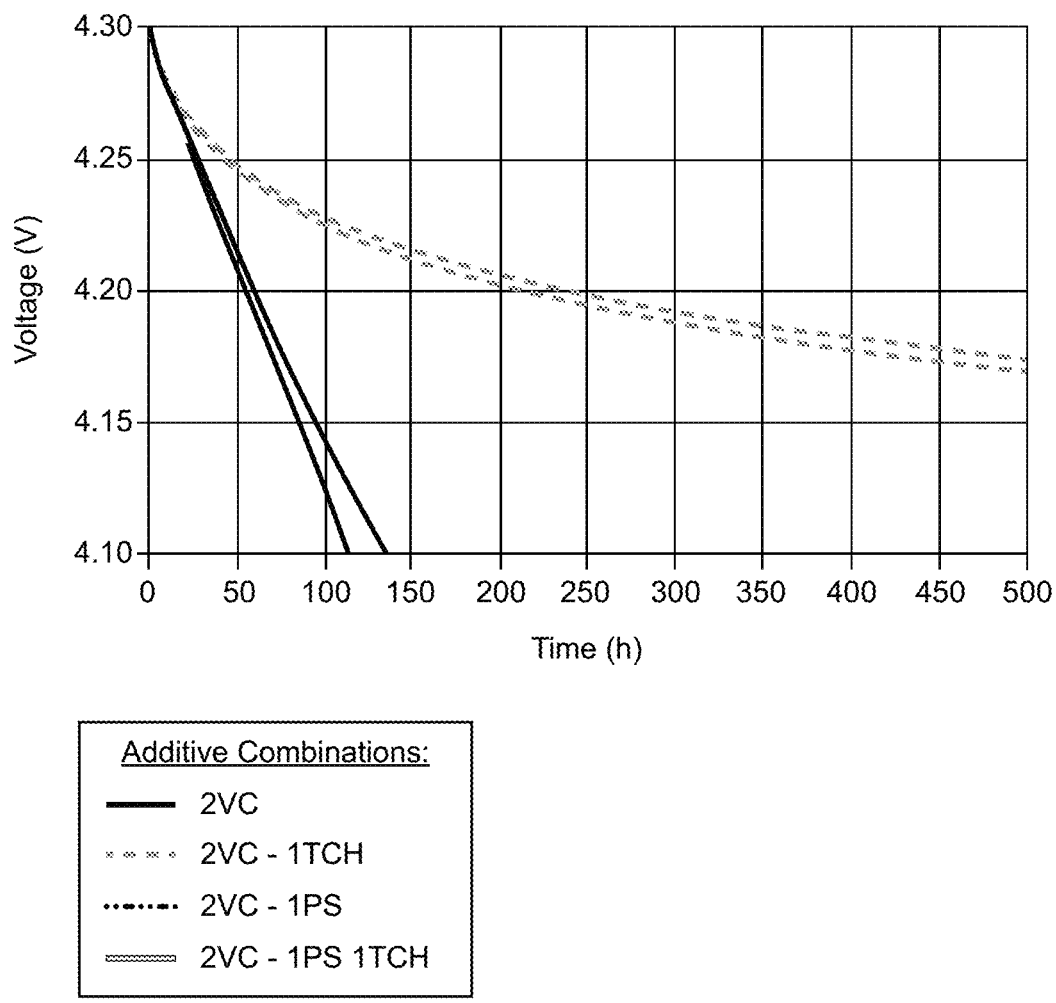
FIG. 9 is a plot of voltage vs. time for examples of embodiments of the disclosure and comparative examples.
Figure 10:
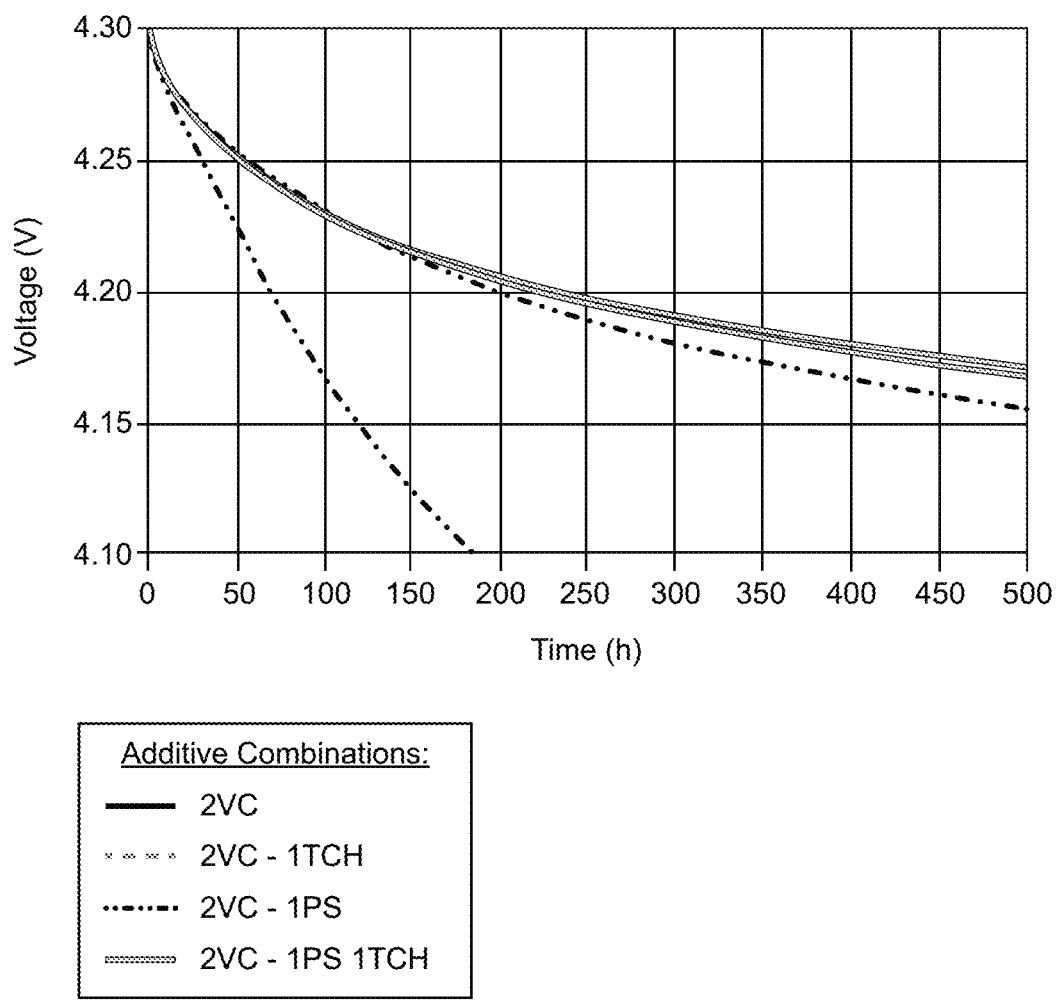
FIG. 10 is a plot of voltage vs. time for examples of embodiments of the disclosure and comparative examples.

As shown in FIGS. 9 and 10, the use of the disclosed electrolyte solutions provided for significant improvements in voltage drop off. In particular, the capacity drop off of the comparative example as indicated by the difference in the upper and lower lines is particularly stark. The TCH electrolytes outperformed the comparative electrolyte/additives.

Example 33

Battery cells were prepared as discussed above. The compositions of the cathode, anode, and electrolyte solution is provided in Table 9, below. 1.2 M $LiPF_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at 2.8V-4.2 V and cycled and were measured for discharge capacity and delta V (cold temperature). Temperature was 0° C. (cold temperature); C/2, C/5 and C/10 discharge rates were employed. "+" represents the C/2 rate; "○" represents C/5 rate; and "●" represents C/10 rate. The results are shown in FIGS. 11 and 12.

TABLE 9

|  | Cathode | Anode | Additives | V |
|---|---|---|---|---|
| Ex. 33 | NMC 622 | Graphite | TCH 1; VC 2 | 4.2 |
| Comp. 33 | NMC 622 | Graphite | VC 2 | 4.2 |

Figure 11:
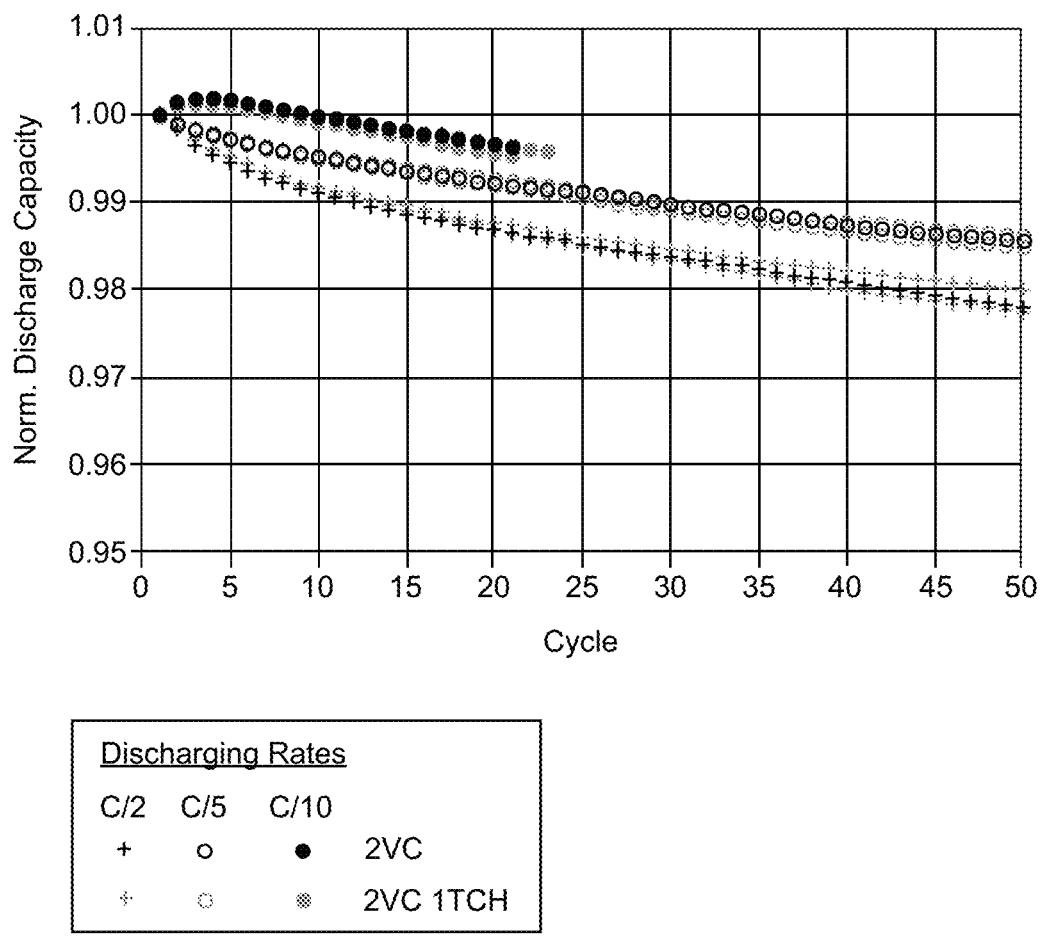
FIG. 11 is a plot of norm. discharge capacity vs. cycles for examples of embodiments of the disclosure and comparative examples.
Figure 12:
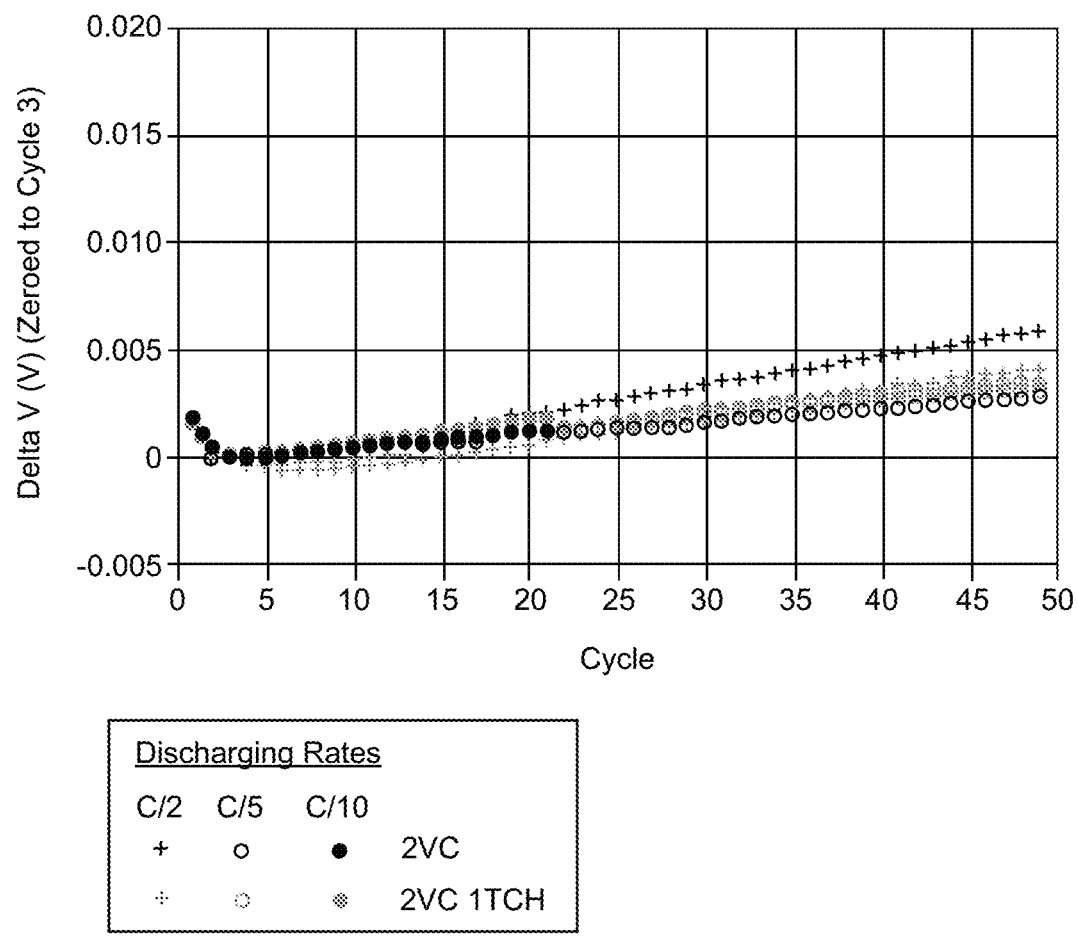
FIG. 12 is a plot of (zeroed) delta V vs. cycles for examples of embodiments of the disclosure and comparative examples.

As shown in FIGS. 11 and 12, the use of the disclosed electrolyte solutions provided for significant improvements in cold temperature performance. The TCH electrolytes outperformed the comparative electrolyte/additives.

Example 34

Battery cells were prepared as discussed above for Example 33. The compositions of the cathode, anode, and electrolyte solution is provided in Table 10, below.

The cells were operated at 2.8V-4.2 V and cycled and were measured for discharge capacity (cold temperature). Temperature was 0° C. (cold temperature); C/2, C/5 and C/10 discharge rates were employed. "+" represents the C/2 rate; "○" represents C/5 rate; and "●" represents C/10 rate. The results are shown in FIG. 13.

TABLE 10

|  | Cathode | Anode | Additives | V |
|---|---|---|---|---|
| Ex. 34 | NMC 622 | Graphite | TCH 1; PS 2 | 4.2 |
| Comp. 34 | NMC 622 | Graphite | PS 2 | 4.2 |

Figure 13:
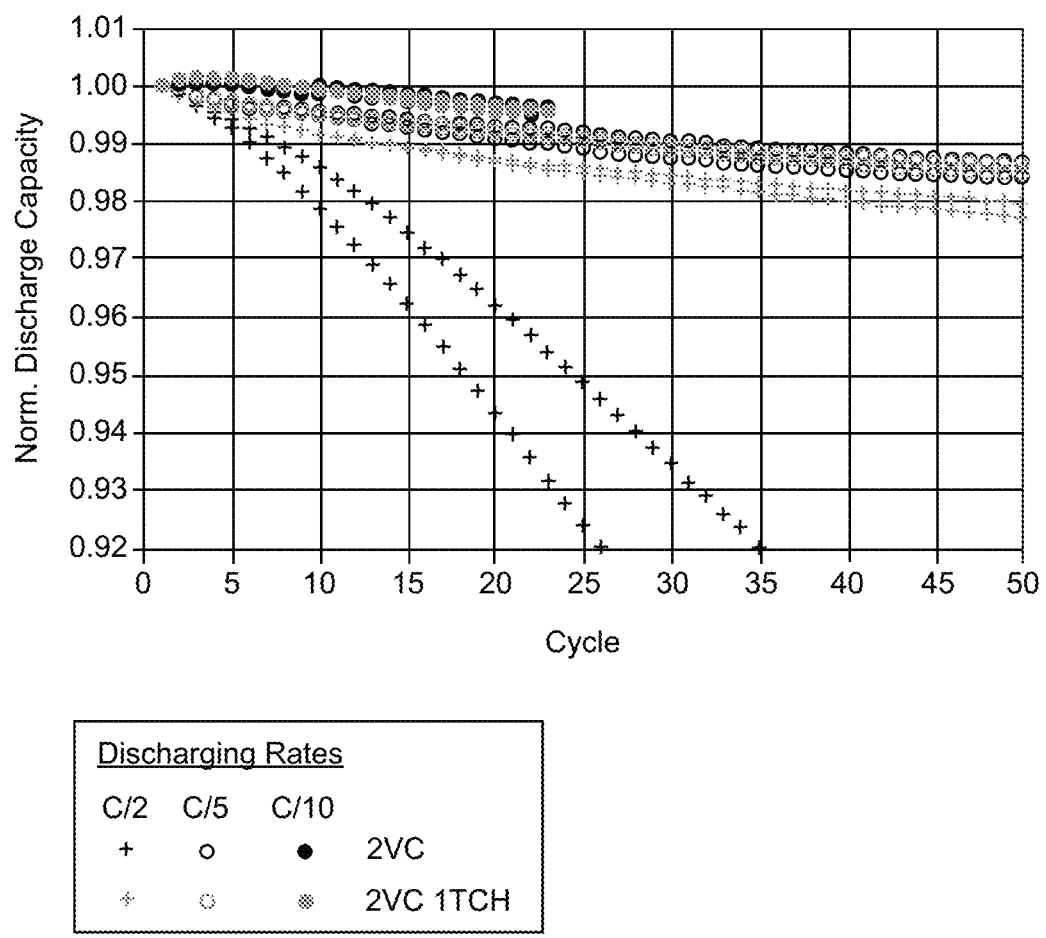
FIG. 13 is a plot of norm. discharge capacity vs. cycles for examples of embodiments of the disclosure and comparative examples.
Figure 14:
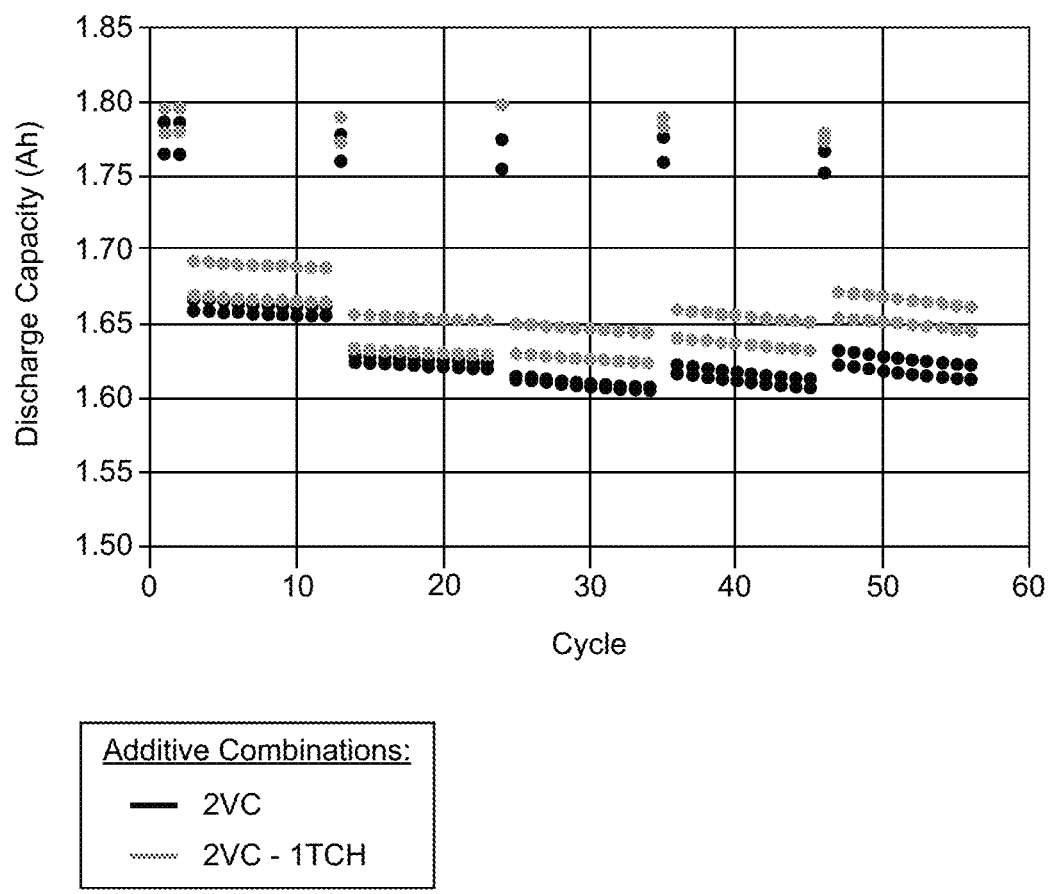
FIG. 14 is a plot of discharge capacity vs. cycles for examples of embodiments of the disclosure and comparative examples.
Figure 15:
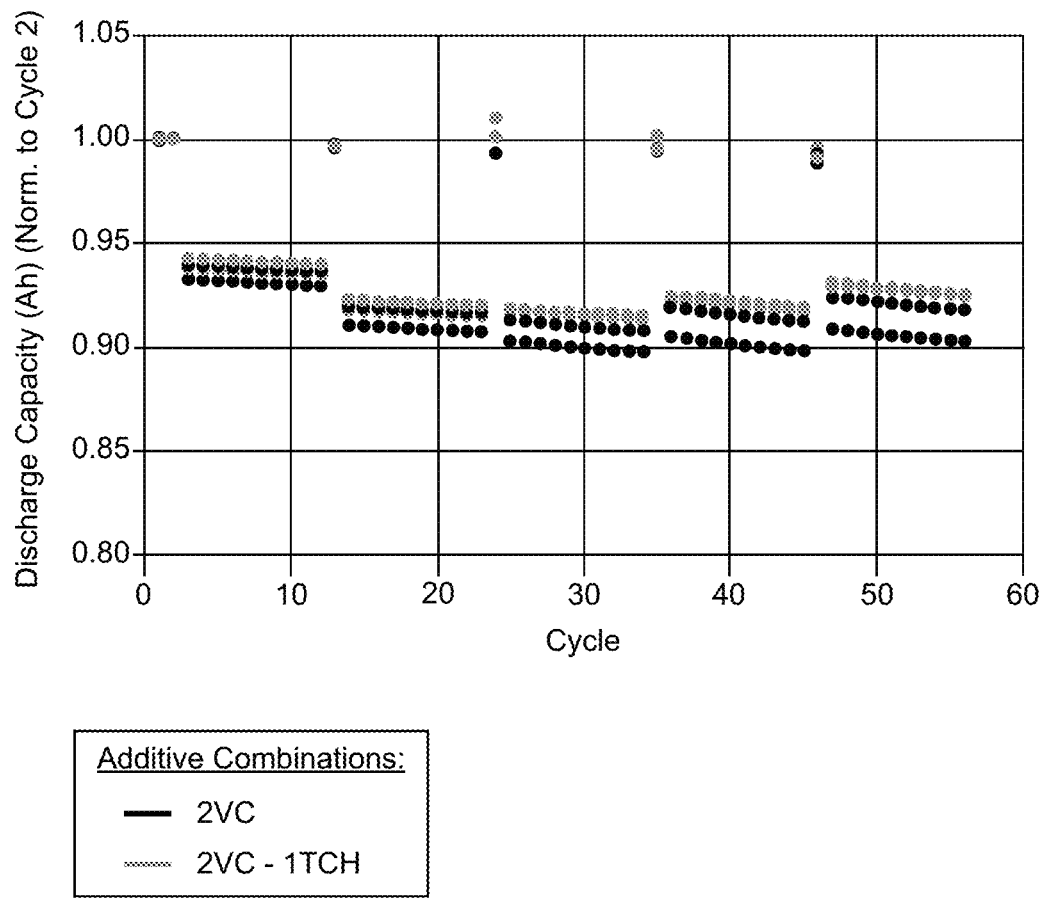
FIG. 15 is a plot of discharge capacity vs. cycles for examples of embodiments of the disclosure and comparative examples.
Figure 16:
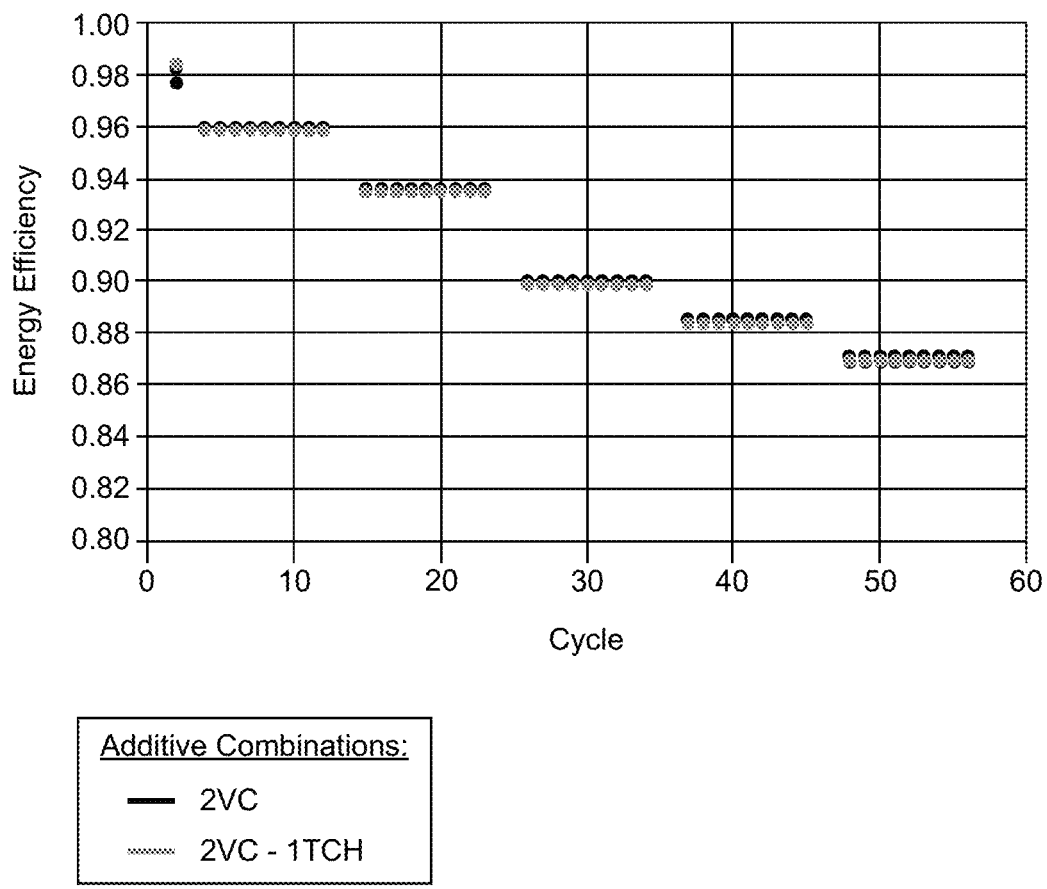
FIG. 16 is a plot of energy efficiency vs. cycles for examples of embodiments of the disclosure and comparative examples.
Figure 17:
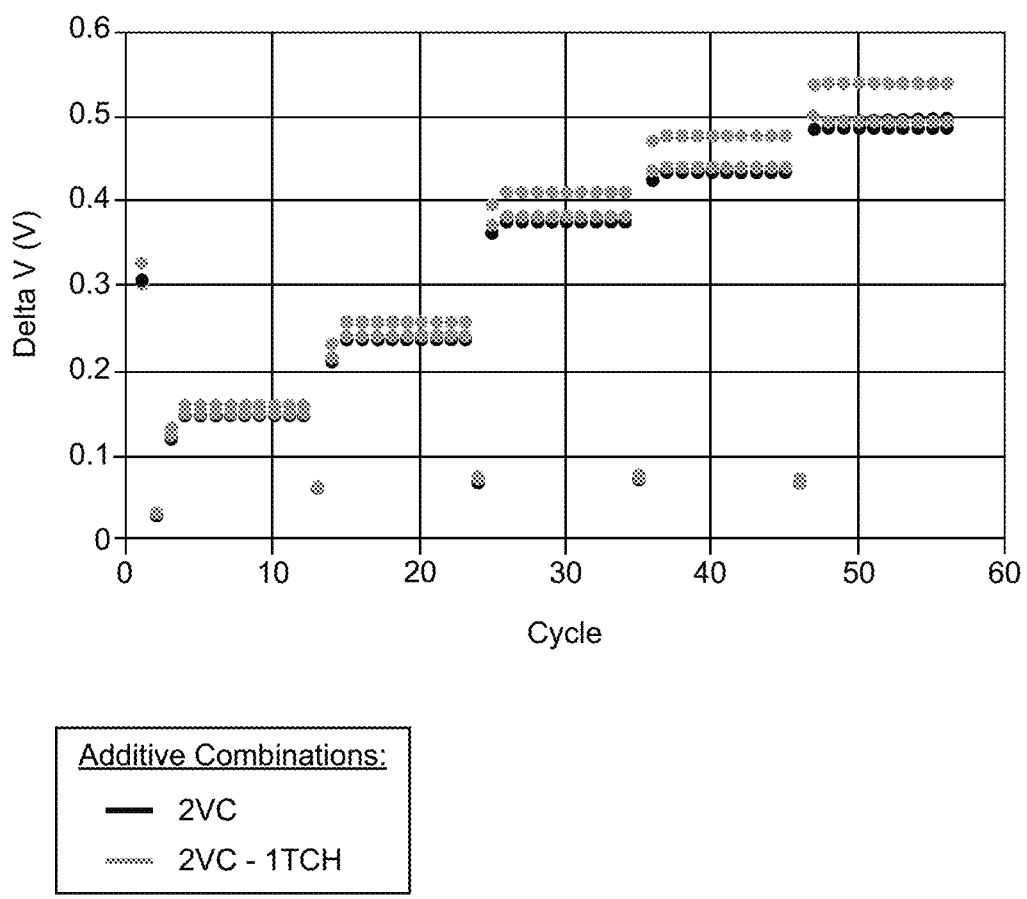
FIG. 17 is a plot of delta V vs. cycles for examples of embodiments of the disclosure and comparative examples.

As shown in FIG. 13, the use of the disclosed electrolyte solutions provided for significant improvements in cold temperature performance. In particular, the capacity drop off of the comparative example as indicated by the difference in the upper and lower lines is particularly stark. The TCH electrolytes outperformed the comparative electrolyte/additives.

Example 34

Battery cells were prepared as discussed above. The compositions of the cathode, anode, and electrolyte solution is provided in Table 11, below. 1.2 M $LiPF_6$ was dissolved into a base solvent comprising ethylene carbonate (EC), ethyl methyl carbonate (EMC), and dimethyl carbonate (DMC) at a weight ratio of 25:5:70. Comparative examples include non-TCH additives in the additive package.

The cells were operated at 2.8V-4.2 V and fast cycled and were measured for high rate discharge capacity, energy efficiency, and delta V. Temperature was 30° C.; C/2, C/5 and C/10 discharge rates were employed. The results are shown in FIGS. 14-17.

TABLE 11

|  | Cathode | Anode | Additives | V |
|---|---|---|---|---|
| Ex. 34 | NMC 622 | Graphite | TCH 1; VC 2 | 4.2 |
| Comp. 34 | NMC 622 | Graphite | VC 2 | 4.2 |

As shown in FIGS. 14-17, the use of the disclosed electrolyte solutions provided for significant improvements in high rate performance. The TCH electrolytes outperformed the comparative electrolyte/additives.

Example 35-37

Electrolyte solutions were prepared as discussed above. 1.2 M $LiPF_6$ was dissolved into a base solvent comprising ethylene carbonate (EC), ethyl methyl carbonate (EMC), and dimethyl carbonate (DMC) at a weight ratio of 25:5:70. The composition of the additive package of the electrolyte solutions is provided in Table 12, below.

TABLE 12

|  | Component 1 | Component 2 | Component 3 | Mass Ratio |
|---|---|---|---|---|
| Ex. 35 | Vinylene carbonate | Tricyanohexane | n/a | 2:1 |
| Ex. 36 | Fluoroethylene carbonate | Tricyanohexane | n/a | 2:1 |
| Ex. 37 | Vinylene carbonate | Tricyanohexane | MMDS | 2:1:1 |
| Comp. 35 | Vinylene carbonate | MMDS | n/a | 2:1 |
| Comp. 36 | Fluoroethylene carbonate | Succinonitrile | n/a | 2:1 |

Cells were prepared as discussed above using the materials shown in Table 13. The cells were operated at 4.2 V-4.4 V. The voltage drop, gas generation value, coulombic efficiency (first and $20^{th}$ cycle) for each electrolyte solution was measured at varying voltages. Results are reported in Table 13, below. The results are shown in Table 13.

TABLE 13

| Electrolyte | Li-Containing Oxide | Voltage (V) | Voltage Drop (V) | Gas Generation (mL) | CE $1^{st}$ Cycle | CE $20^{th}$ Cycle |
|---|---|---|---|---|---|---|
| Ex. 35 | $LiNi_6Mn_2Co_2O_2$ | 4.2 | 0.04 | 0.12 | 0.87 |  |
|  |  | 4.3 | 0.065 | 0.14 | 0.878 |  |
|  |  | 4.4 | 0.09 | 0.22 | 0.88 |  |

TABLE 13-continued

| Electrolyte | Li-Containing Oxide | Voltage (V) | Voltage Drop (V) | Gas Generation (mL) | CE 1st Cycle | CE 20th Cycle |
|---|---|---|---|---|---|---|
|  | LiNi$_8$MnCoO$_2$ | 4.2 | 0.069 | 0.3 | 0.88 | 0.9985 |
|  | LiNiCoAlO$_2$ | 4.2 | 0.058 | 0.18 | 0.87 | 0.9985 |
| Ex. 36 | LiNi$_6$Mn$_2$Co$_2$O$_2$ | 4.2 | 0.05 | 0.61 | 0.86 |  |
|  |  | 4.3 | 0.072 | 0.62 | 0.87 |  |
|  |  | 4.4 | 0.1 | 0.58 | 0.875 |  |
|  | LiNi$_8$MnCoO$_2$ | 4.2 | 0.072 | 0.82 | 0.872 | 0.998 |
|  | LiNiCoAlO$_2$ | 4.2 | 0.065 | 0.52 | 0.87 | 0.998 |
| Ex. 37 | LiNi$_6$Mn$_2$Co$_2$O$_2$ | 4.2 | 0.04 | 0.13 | 0.883 |  |
|  |  | 4.3 | 0.065 | 0.125 | 0.887 |  |
|  |  | 4.4 | 0.08 | 0.15 | 0.89 |  |
|  | LiNi$_8$MnCoO$_2$ | 4.2 | 0.065 | 0.3 | 0.885 | 0.9985 |
|  | LiNiCoAlO$_2$ | 4.2 | 0.062 | 0.17 | 0.88 | 0.9985 |
| Comp. 35 | LiNi$_6$Mn$_2$Co$_2$O$_2$ | 4.2 | 0.04 | 0.28 | 0.887 |  |
|  |  | 4.3 | 0.06 | 0.35 | 0.892 |  |
|  |  | 4.4 | 0.08 | 0.45 | 0.893 |  |
|  | LiNi$_8$MnCoO$_2$ | 4.2 | 0.071 | 0.5 | 0.883 | 0.9975 |
|  | LiNiCoAlO$_2$ | 4.2 | 0.055 | 0.3 | 0.887 | 0.9985 |
| Comp. 36 | LiNi$_6$Mn$_2$Co$_2$O$_2$ | 4.2 | 0.055 | 0.78 | 0.852 |  |
|  |  | 4.3 | 0.08 | 0.85 | 0.87 |  |
|  |  | 4.4 | 0.11 | 0.9 | 0.87 |  |
|  | LiNi$_8$MnCoO$_2$ | 4.2 | 0.08 | 0.9 | 0.865 | 0.998 |
|  | LiNiCoAlO$_2$ | 4.2 | 0.07 | 0.7 | 0.86 | 0.9978 |

As shown in Table 13, the electrolyte solutions described herein demonstrate relatively low voltage drop, even as the voltage of the secondary cell increases. Also, the electrolyte solutions described herein demonstrated relatively low gas generation values at various voltages and the electrolyte solutions demonstrated relatively high first cycle CE at various voltages.

The cells were tested for impedance. The impedance was measured for the first cycle and for the twenty-fifth cycle. Results are reported in Table 14, below.

TABLE 14

| Electrolyte | Li-Containing Oxide | Impedance (V) Cycle 1 | Cycle 25 | Growth (%) |
|---|---|---|---|---|
| Ex. 35 | LiNi$_8$MnCoO$_2$ | 0.045 | 0.050 | 11.1 |
|  | LiNiCoAlO$_2$ | 0.050 | 0.057 | 14 |
| Ex. 36 | LiNi$_8$MnCoO$_2$ | 0.044 | 0.048 | 9.1 |
|  | LiNiCoAlO$_2$ | 0.052 | 0.057 | 9.6 |
| Ex. 37 | LiNi$_8$MnCoO$_2$ | 0.046 | 0.048 | 4.3 |
|  | LiNiCoAlO$_2$ | 0.047 | 0.050 | 6.4 |
| Comp. 35 | LiNi$_8$MnCoO$_2$ | 0.046 | 0.057 | 23.9 |
|  | LiNiCoAlO$_2$ | 0.048 | 0.057 | 18.8 |
| Comp. 36 | LiNi$_8$MnCoO$_2$ | 0.045 | 0.048 | 6 |
|  | LiNiCoAlO$_2$ | 0.052 | 0.058 | 11.6 |

As shown in Table 14, the electrolyte solutions described herein demonstrate relatively low impedance and the impedance has low growth with continued cycling.

Unless otherwise indicated, performance measurements in the examples were determined by differential capacity analysis, electromechanical impedance spectroscopy, cyclic and linear voltammetry, and high precision coulometry, as is known in the art.

Embodiments

As used below, any reference to a series of embodiments is to be understood as a reference to each of those embodiments disjunctively (e.g., "Embodiments 1-4" is to be understood as "Embodiments 1, 2, 3, or 4").

Embodiment 1 is an electrolyte solution comprising: a trinitrile compound having a chemical formula $C_xH_{2x-1}(CN)_3$, wherein x is from 4 to 10; and a carbonate compound having a chemical structure:

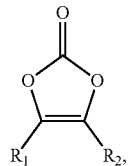

wherein R1 and R2 are independently selected from hydrogen, halogen, (C1-C10)alkyl, or (C1-C10)haloalkyl, wherein the electrolyte solution demonstrates a voltage drop of less than 0.25 V.

Embodiment 2 is the electrolyte solution of embodiment(s) 1, wherein the trinitrile compound comprises tricyanohexane.

Embodiment 3 is the electrolyte solution of embodiment(s) 1-2, wherein the carbonate compound comprises vinylene carbonate.

Embodiment 4 is the electrolyte solution of embodiment(s) 1-3, wherein a weight ratio of the carbonate compound to the trinitrile compound is from 0.5:1 to 5:1.

Embodiment 5 is the electrolyte solution of embodiment(s) 1-4, wherein the trinitrile compound comprises TCH, wherein the carbonate compound comprises VC, and wherein the solution demonstrates a voltage drop of less than 0.25 V, and wherein the electrolyte solution demonstrates a gas value of less than 3 mL.

Embodiment 6 is the electrolyte solution of embodiment(s) 1-5, further comprising methylene methane disulfonate.

Embodiment 7 is the electrolyte solution of embodiment(s) 1-6, wherein the electrolyte solution exhibits an average coulombic efficiency greater than 0.9 over 20 cycles.

Embodiment 8 is the electrolyte solution of embodiment(s) 1-7, wherein the electrolyte solution exhibits an impedance growth of less than 20% over 25 cycles.

Embodiment 9 is an electrolyte solution comprising: a trinitrile compound having a chemical formula CxH2x−1 (CN)3, wherein x is from 4 to 10; a carbonate compound having a chemical structure:

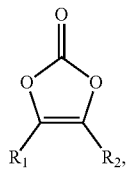

wherein R1 and R2 are independently selected from hydrogen, halogen, (C1-C5)alkyl, or (C1-C5)haloalkyl; and a sulfonate compound having a chemical structure:

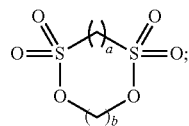

wherein a and b are independently from 1 to 4, wherein the electrolyte solution demonstrates a voltage drop of less than 0.25 V.

Embodiment 10 is the electrolyte solution of embodiment(s) 9, wherein the trinitrile compound comprises tricyanohexane.

Embodiment 11 is the electrolyte solution of embodiment(s) 9-10, wherein the carbonate compound comprises vinylene carbonate.

Embodiment 12 is the electrolyte solution of embodiment(s) 9-11, wherein the sulfonate compound comprises methylene methane disulfonate.

Embodiment 13 is the electrolyte solution of embodiment(s) 9-12, wherein a weight ratio of the carbonate compound to the trinitrile compound is from 0.5:1 to 5:1.

Embodiment 14 is the electrolyte solution of embodiment(s) 9-13, wherein a weight ratio of the carbonate compound to the sulfonate compound is from 0.1:1 to 3:1.

Embodiment 15 is the electrolyte solution of embodiment(s) 9-14, wherein the electrolyte solution exhibits an average coulombic efficiency greater than 0.9 over 20 cycles.

Embodiment 16 is the electrolyte solution of embodiment(s) 9-15, wherein the electrolyte solution exhibits an impedance growth of less than 20% over 25 cycles.

Embodiment 17 is an electrolyte solution comprising: a trinitrile compound having a chemical formula CxH2x−1 (CN)3, wherein x is from 4 to 10; a carbonate compound having a chemical structure:

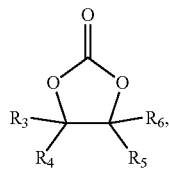

wherein R3, R4, R5, and R6 are independently selected from hydrogen, halogen, (C1-C10)alkyl, or (C1-C10)haloalkyl.

Embodiment 18 is the electrolyte solution of embodiment(s) 17, wherein the trinitrile compound comprises tricyanohexane.

Embodiment 19 is the electrolyte solution of embodiment(s) 17-18, wherein the carbonate compound comprises fluoroethylene carbonate.

Embodiment 20 is the electrolyte solution of embodiment(s) 17-19, wherein a weight ratio of the carbonate compound to the trinitrile compound is from 0.5:1 to 5:1.

Embodiment 21 is the electrolyte solution of embodiment(s) 17-20, wherein the electrolyte solution exhibits an average coulombic efficiency greater than 0.9 over 20 cycles.

Embodiment 22 is the electrolyte solution of embodiment(s) 17-21, wherein the electrolyte solution exhibits an impedance growth of less than 20% over 25 cycles.

Embodiment 23 is a secondary cell comprising: a cathode having a cathode active material comprising a lithium-containing transition metal composite oxide; an anode comprising graphite; and the electrolyte solution of any of the preceding embodiments.

Embodiment 24 is the secondary cell of embodiment(s) 23, wherein the lithium-containing transition metal composite oxide has a chemical formula LiNixMnyCozO2, wherein x, y, and z are independently selected from 0 to 8.

Embodiment 25 is the secondary cell of embodiment(s) 23-24, wherein the lithium-containing transition metal composite oxide has a chemical formula LiNi6Mn2Co2O2.

Embodiment 26 is the secondary cell of embodiment(s) 23-24, wherein the lithium-containing transition metal composite oxide has a chemical formula LiNi8MnCoO2.

Embodiment 27 is the secondary cell of embodiment(s) 23, wherein the lithium-containing transition metal composite oxide has a chemical formula LiNixCoyAlzO2, wherein x, y, and z are independently selected from 0 to 8.

Embodiment 28 is an electrolyte solution comprising an ionic component; a base solvent; and an additive package comprising: a trinitrile compound having a chemical formula $C_xH_{2x-1}(CN)_3$, wherein x is from 4 to 10; and a cyclic carbonate compound having a chemical structure:

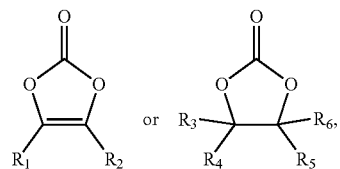

wherein $R_1$, $R_2$, $R_3$, $R_4$, $R_5$, and $R_6$ are independently selected from hydrogen, halogen, ($C_1$-$C_{10}$)alkyl, or ($C_1$-$C_{10}$) haloalkyl, wherein the electrolyte solution comprises symmetric linear carbonate in an amount greater than 19 wt %, based on the total weight of the electrolyte solution.

Embodiment 29 is the electrolyte solution of embodiment(s) 28, wherein the symmetric linear carbonate comprises diethyl carbonate, dimethyl carbonate, or combinations thereof, and wherein the symmetric linear carbonate is present in an amount greater than 19%, based on the total weight of the electrolyte solution.

Embodiment 30 is the electrolyte solution of embodiment(s) 28 or 29, wherein the cyclic carbonate compound comprises vinylene carbonate or ethylene carbonate or combinations thereof.

Embodiment 31 is the electrolyte solution of embodiment(s) 28-30, wherein the cyclic carbonate compound comprises fluoroethylene carbonate.

Embodiment 32 is the electrolyte solution of embodiment(s) 28-31, wherein the electrolyte solution comprises less than 30 wt % cyclic carbonate.

Embodiment 33 is the electrolyte solution of embodiment(s) 28-32, wherein the electrolyte solution comprises less than 30 wt % ethylene carbonate.

Embodiment 34 is the electrolyte solution of embodiment(s) 28-33, wherein the electrolyte solution comprises less than 6 wt % FEC.

Embodiment 35 is the electrolyte solution of embodiment(s) 28-34, wherein the electrolyte solution further comprises asymmetric linear carbonates present in an amount less than 50% wt.

Embodiment 36 is the electrolyte solution of embodiment(s) 28-35, wherein the electrolyte solution further comprises ethylmethyl carbonate in an amount less than 50 wt %.

Embodiment 37 is the electrolyte solution of embodiment(s) 28-36, wherein the trinitrile compound comprises tricyanohexane.

Embodiment 38 is the electrolyte solution of embodiment(s) 28-37, wherein a weight ratio of the cyclic carbonate compound to the trinitrile compound is from 0.5:1 to 5:1.

Embodiment 39 is the electrolyte solution of embodiment(s) 28-38, wherein the additive package further comprises a sulfonate.

Embodiment 40 is the electrolyte solution of embodiment(s) 28-39, wherein the trinitrile compound comprises tricyanohexane, wherein the carbonate compound comprises vinylidene carbonate, and wherein the solution demonstrates a voltage drop of less than 0.25 V.

Embodiment 41 is the electrolyte solution of embodiment(s) 28-40, further comprising methylene methane disulfonate or fluoroethylene carbonate or combinations thereof.

Embodiment 42 is the electrolyte solution of embodiment(s) 28-41, wherein the electrolyte solution exhibits a first cycle coulombic efficiency greater than 0.85 over 20 cycles.

Embodiment 43 is the electrolyte solution of embodiment(s) 28-42, wherein the electrolyte solution exhibits an impedance growth of less than 20% over 25 cycles.

Embodiment 44 is an electrolyte solution comprising: an ionic component; a base solvent; and an additive package comprising: a trinitrile compound having a chemical formula $C_xH_{2x-1}(CN)_3$, wherein x is from 4 to 10; and a sulfonate compound having a chemical structure:

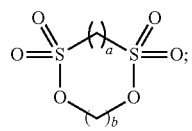

wherein a and b are independently from 1 to 4, wherein the electrolyte solution comprises symmetric linear carbonates in an amount greater than 19 wt %, based on the total weight of the electrolyte solution.

Embodiment 45 is the electrolyte solution of embodiment(s) 44, wherein the trinitrile compound comprises tricyanohexane.

Embodiment 46 is a secondary cell comprising: a cathode, optionally having a cathode active material comprising a lithium-containing transition metal composite oxide; an anode optionally comprising graphite; and an electrolyte solution comprising: an ionic component; a base solvent; and an additive package comprising: a trinitrile compound having a chemical formula $C_xH_{2x-1}(CN)_3$, wherein x is from 4 to 10; and a cyclic carbonate compound having a chemical structure:

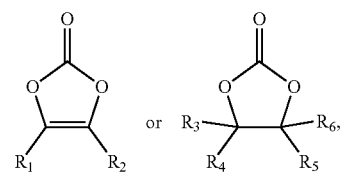

wherein $R_1$, $R_2$ $R_3$, $R_4$, $R_5$, and $R_6$ are independently selected from hydrogen, halogen, $(C_1\text{-}C_{10})$alkyl, or $(C_1\text{-}C_{10})$ haloalkyl, wherein the electrolyte solution comprises symmetric linear carbonate in an amount greater than 19 wt %, based on the total weight of the electrolyte solution.

Embodiment 47 is the electrolyte solution of embodiment(s) 46, wherein the cell demonstrates a 5 day gas generation value of less than 4.9 mL when operated at 4.48 volts.

We claim:

1. An electrolyte solution comprising:
an ionic component;
a base solvent comprising symmetric linear carbonate; and
an additive package comprising:
a trinitrile compound having a chemical structure $C_xH_{2x-1}(CN)_3$, wherein x is from 4 to 10; and
a cyclic carbonate compound having a chemical structure:

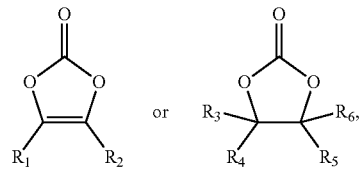

wherein $R_1$, $R_2$ $R_3$, $R_4$, $R_6$, and $R_6$ are independently selected from hydrogen, halogen, $(C_1\text{-}C_{10})$alkyl, or $(C_1\text{-}C_{10})$ haloalkyl,
wherein the electrolyte solution comprises symmetric linear carbonate in an amount greater than 25 wt % based on the total weight of the electrolyte solution.

2. The electrolyte solution of claim 1, wherein the symmetric linear carbonate comprises diethyl carbonate, or dimethyl carbonate, or combinations thereof, and wherein the diethyl carbonate, or dimethyl carbonate, or combinations thereof is present in an amount greater than 25 wt %, based on the total weight of the electrolyte solution.

3. The electrolyte solution of claim 1, wherein the cyclic carbonate compound is vinylene carbonate or ethylene carbonate.

4. The electrolyte solution of claim 1, wherein the cyclic carbonate compound is fluoroethylene carbonate.

5. The electrolyte solution of claim 1, wherein the electrolyte solution comprises less than 30 wt % total cyclic carbonates.

6. The electrolyte solution of claim 1, wherein the electrolyte solution comprises less than 30 wt % ethylene carbonate.

7. The electrolyte solution of claim 1, wherein the electrolyte solution comprises less than 6 wt % fluoroethylene carbonate.

8. The electrolyte solution of claim 1, wherein the electrolyte solution further comprises asymmetric linear carbonates in an amount less than 50 wt %.

9. The electrolyte solution of claim 1, wherein the electrolyte solution further comprises ethylmethyl carbonate in an amount less than 50 wt %.

10. The electrolyte solution of claim 1, wherein the trinitrile compound comprises tricyanohexane.

11. The electrolyte solution of claim 1, wherein a weight ratio of the cyclic carbonate compound to the trinitrile compound is from 0.5:1 to 5:1.

12. The electrolyte solution of claim 1, wherein the additive package further comprises a sulfonate.

13. The electrolyte solution of claim 1, wherein the trinitrile compound comprises tricyanohexane, wherein the carbonate compound comprises vinylidene carbonate, and wherein the solution demonstrates a voltage drop of less than 0.25 V.

14. The electrolyte solution of claim 1, further comprising methylene methane disulfonate or fluoroethylene carbonate or combinations thereof.

15. The electrolyte solution of claim 1, wherein the electrolyte solution exhibits a first cycle coulombic efficiency greater than 0.85 over 20 cycles.

16. The electrolyte solution of claim 1, wherein the electrolyte solution exhibits an impedance growth of less than 20% over 25 cycles.

17. An electrolyte solution comprising:
an ionic component;
a base solvent; and
an additive package comprising:
a trinitrile compound having a chemical structure $C_xH_{2x-1}(CN)_3$, wherein x is from 4 to 10; and
a sulfonate compound having a chemical structure:

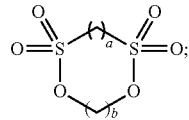

wherein a and b are independently from 1 to 4, wherein the electrolyte solution comprises symmetric linear carbonates in an amount greater than 25 wt %, based on the total weight of the electrolyte solution; and wherein the electrolyte solution exhibits a first cycle coulombic efficiency greater than 0.85 over 20 cycles and/or an impedance growth of less than 20% over 25 cycles.

18. The electrolyte solution of claim 17, wherein the trinitrile compound comprises tricyanohexane.

19. A secondary cell comprising:
a cathode, optionally having a cathode active material comprising a lithium-containing transition metal composite oxide;
an anode optionally comprising graphite; and
an electrolyte solution comprising:
an ionic component;
a base solvent; and
an additive package comprising:
a trinitrile compound having a chemical structure $C_xH_{2x-1}(CN)_3$, wherein x is from 4 to 10; and
a cyclic carbonate compound having a chemical structure:

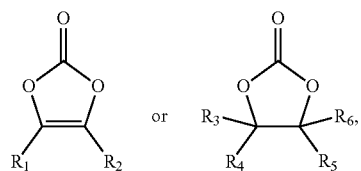

wherein $R_1$, $R_2$ $R_3$, $R_4$, $R_6$, and $R_6$ are independently selected from hydrogen, halogen, $(C_1-C_{10})$alkyl, or $(C_1-C_{10})$haloalkyl, wherein the electrolyte solution comprises symmetric linear carbonate in an amount greater than 25 wt %, based on the total weight of the electrolyte solution.

20. The secondary cell of claim 19, wherein the cell demonstrates a 5 day gas generation value of less than 4.9 mL when operated at 4.48 volts.

* * * * *